US012640606B2

(12) United States Patent
Ohsugi et al.

(10) Patent No.: US 12,640,606 B2
(45) Date of Patent: May 26, 2026

(54) ROTOR CORE, ROTOR, AND ROTATING ELECTRICAL MACHINE

(71) Applicant: NIPPON STEEL CORPORATION, Tokyo (JP)

(72) Inventors: Yasuo Ohsugi, Tokyo (JP); Rei Honma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 134 days.

(21) Appl. No.: 18/552,916

(22) PCT Filed: Mar. 28, 2022

(86) PCT No.: PCT/JP2022/015202
§ 371 (c)(1),
(2) Date: Sep. 28, 2023

(87) PCT Pub. No.: WO2022/210609
PCT Pub. Date: Oct. 6, 2022

(65) Prior Publication Data
US 2024/0171024 A1 May 23, 2024

(30) Foreign Application Priority Data

Mar. 31, 2021 (JP) ................................. 2021-060596

(51) Int. Cl.
*H02K 1/276* (2022.01)
(52) U.S. Cl.
CPC .................................. *H02K 1/2766* (2013.01)

(58) Field of Classification Search
CPC .. H02K 1/2766; H02K 2213/03; H02K 1/276; H02K 21/14; H02K 29/03
See application file for complete search history.

(56) References Cited

U.S. PATENT DOCUMENTS

2010/0148612 A1* 6/2010 Takemoto ............ H02K 1/2746
310/156.53
2012/0091845 A1* 4/2012 Takemoto .............. H02K 1/276
310/156.01
2013/0106234 A1 5/2013 Kagami et al.

FOREIGN PATENT DOCUMENTS

| JP | S63-206143 A | 8/1988 |
| JP | H04-034836 U | 3/1992 |
| JP | 2010-158085 A | 7/2010 |
| JP | 2011-083047 A | 4/2011 |

(Continued)

*Primary Examiner* — Christopher M Koehler
*Assistant Examiner* — Riley Owen Stout
(74) *Attorney, Agent, or Firm* — SOLARIS Intellectual Property Group, PLLC

(57) ABSTRACT

A rotor core includes plural holes in which permanent magnets are installed, wherein: at least one of the plural holes includes a first end portion positioned on a leading side in a rotational direction, and a second end portion positioned on a trailing side in the rotational direction; the hole in which the first end portion is open has an inner space and a first outer space that communicates with the inner space, has the first end portion as one end portion of the hole in a left and right direction, and is wider than the inner space; and the first end portion is disposed off-center on the trailing side in the rotational direction relative to a circumferential direction center position of the inner space at the position where the inner space communicates with the first outer space.

9 Claims, 12 Drawing Sheets

(56) References Cited

FOREIGN PATENT DOCUMENTS

| JP | 2012-085433 A | 4/2012 |
| JP | 2013-099047 A | 5/2013 |

* cited by examiner

ROTOR CORE, ROTOR, AND ROTATING ELECTRICAL MACHINE

TECHNICAL FIELD

The present disclosure relates to a rotor core, a rotor, and a rotating electrical machine.

BACKGROUND ART

In permanent magnet embedded types of rotating electrical machines, such as interior permanent magnet synchronous motors (IPMSMs), permanent magnets are embedded in a rotor core, and flux barriers are formed in the vicinities of the permanent magnets. The flux barriers are for controlling the flow of magnetic flux in the rotating electrical machine and improving the characteristics of the rotating electrical machine.

JP-A No. 2013-99047 discloses communicating magnet insertion holes provided in the rotor core with the outer peripheral side of the rotor core to thereby prevent the magnetic flux emitted from the permanent magnets from short-circuiting around the permanent magnets in the rotor core.

SUMMARY OF INVENTION

Technical Problem

However, the technology described in JP-A No. 2013-99047 only considers magnetic short-circuiting of the magnetic flux in the rotor core when communicating the magnet insertion holes provided in the rotor core with the outer peripheral side of the rotor core. Consequently, it cannot sufficiently increase the torque of a rotating electrical machine.

The present disclosure has been made in view of the problem described above, and it is an object thereof to increase the torque of a rotating electrical machine.

Solution to Problem

A rotor core of an aspect of the present disclosure includes plural holes in which permanent magnets are installed, wherein:

in a cross-section of the rotor core perpendicular to a rotational axis serving as a center of rotation, at least one of the plural holes includes a first end portion positioned on a leading side in a rotational direction in a left and right direction, which is a direction on both left and right sides relative to a direction of magnetization of the permanent magnet, and a second end portion positioned on a trailing side in the rotational direction in the left and right direction;

the first end portion is open to an outer peripheral surface of the rotor core, and a circumferential direction length of the opening is longer than a circumferential direction length of the second end portion;

in the cross-section, the hole in which the first end portion is open has an inner space whose width direction length is equal to a length corresponding to a length of the permanent magnet in the direction of magnetization and a first outer space that communicates with the inner space, has the first end portion as one end portion of the hole in the left and right direction, and is wider than the inner space; and the first end portion is disposed off-center on the trailing side in the rotational direction relative to a circumferential direction center position of the inner space at a position where the inner space communicates with the first outer space.

Advantageous Effects of Invention

According to the aspect of the present disclosure, the torque of the rotating electrical machine can be increased.

DESCRIPTION OF EMBODIMENTS

Embodiments of the present disclosure will be described below with reference to the drawings.

It will be noted that when objects of comparison, such as length, position, size, or spacing, are the same, this shall include cases where they are strictly the same and also cases where they differ without departing from the spirit of the present disclosure (e.g., where they differ in a tolerance range defined at the time of design). Furthermore, in each of the drawings, the x-y-z coordinates represent directional relationships in each of the drawings. In the x-y-z coordinates, the symbol comprising a circle with a black dot inside is a symbol representing that the direction heading from the far side of the page to the near side is a positive direction.

First Embodiment

First, a first embodiment will be described. In the present embodiment, a case where the rotating electrical machine is an IPMSM is described as an example.

Figure 1:
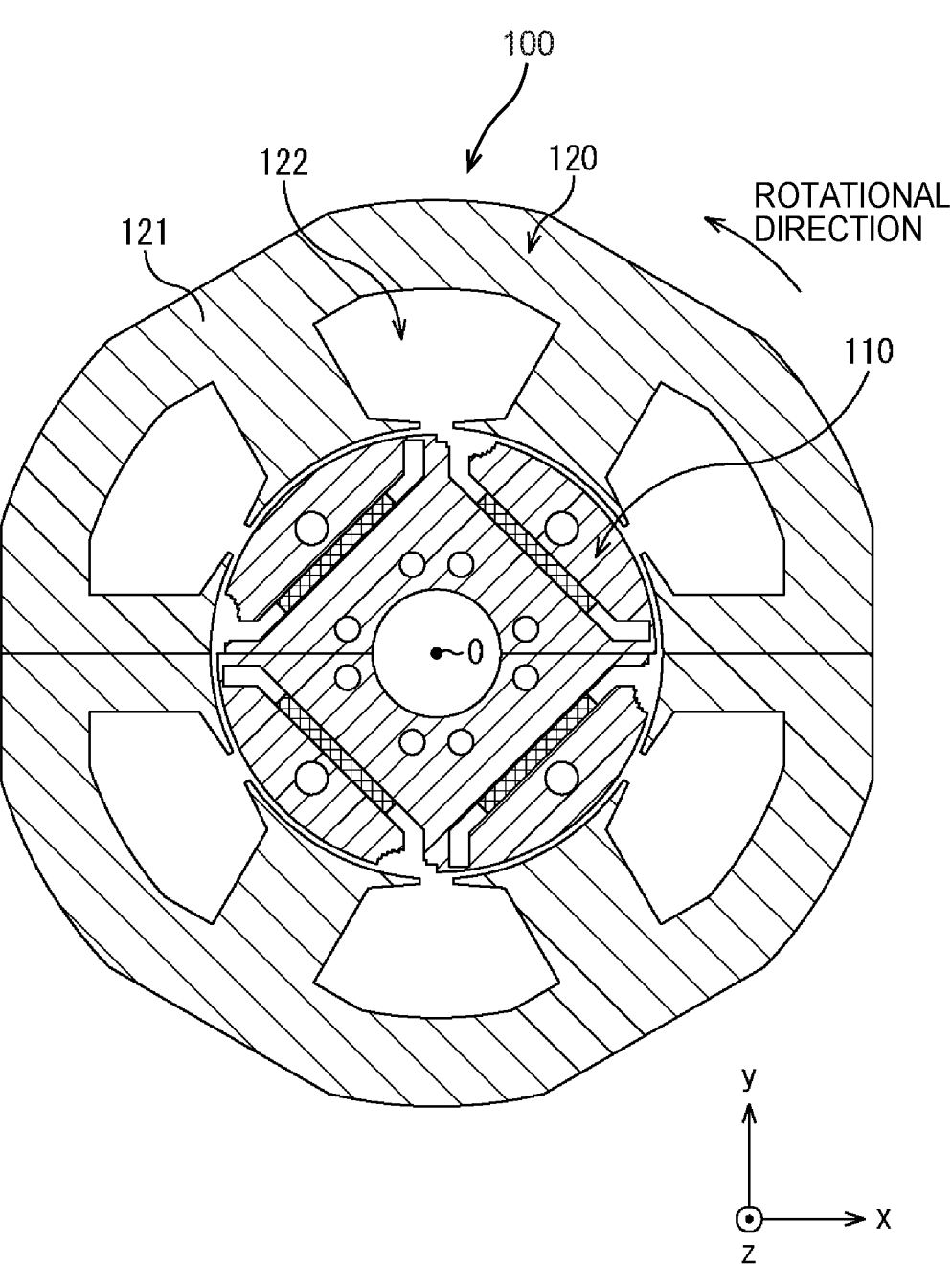
FIG. 1 is a view showing an example of the configuration of an IPMSM.

FIG. 1 is a view showing an example of the configuration of an IPMSM 100. FIG. 1 is a sectional view of the IPMSM 100 as cut perpendicular to a centerline O of the IPMSM 100 (a rotational axis of a rotor 110). In FIG. 1, the IPMSM 100 includes a rotor 110 and a stator 120.

The stator 120 includes a stator core 121 and stator coils (not shown in the drawings) and is for generating a rotating magnetic field. It will be noted that in FIG. 1 illustration of the stator coils with which the stator 120 is equipped is omitted because otherwise the notation would become complicated, but the stator coils are disposed in slots 122 of the stator core 121 (it will be noted that in FIG. 1 only one of the six slots is assigned a reference sign).

Figure 2:
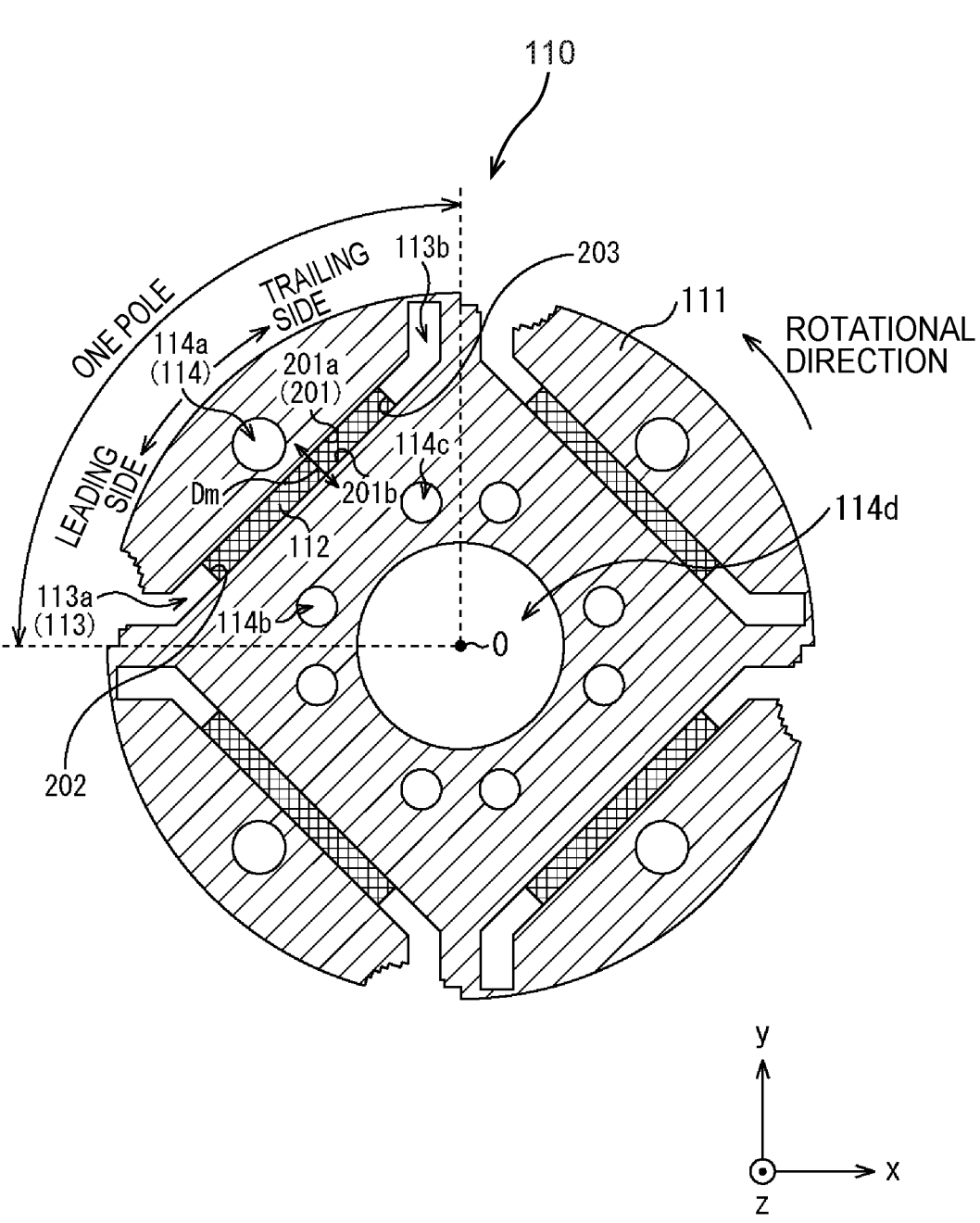
FIG. 2 is a view showing a first example of the configuration of a rotor and corresponds to a rotor of FIG. 1.

The rotor 110 rotates about a centerline O of the rotor 110 as a rotational axis. In the present embodiment, a case where the rotor 110 rotates in the direction of the arrowed line shown in FIG. 1 (i.e., the counterclockwise direction as one faces the page) and where the rotor 110 does not rotate in the opposite direction (i.e., the clockwise direction as one faces the page) of the direction of the arrowed line shown in FIG. 1 is described as an example. FIG. 2 is a view showing an example of the configuration of the rotor 110. FIG. 2 also, like FIG. 1, is a sectional view of the rotor 110 as cut perpendicular to the centerline O of the rotor 110. It will be noted that the centerline O of the rotor 110 and the centerline O of the IPMSM 100 are coincident with each other.

As shown in FIG. 2, the rotor 110 includes a rotor core 111 and plural permanent magnets 112 (here, one permanent magnet per pole). The rotor core 111 includes a soft magnetic body, which is a portion formed of a soft magnetic material in the rotor core 111, and plural hole portions. The soft magnetic body is, for example, configured by stacking plural electromagnetic steel sheets along the centerline O of the rotor 110. However, it is not always necessary for the soft magnetic body to be configured by stacking plural electromagnetic steel sheets. The rotor core 111 may, for example, be a magnetic powder core, an amorphous core, and a nanocrystalline core. It will be noted that in a case where the rotor core 111 is a magnetic powder core, an amorphous core, or a nanocrystalline core, the soft magnetic body with which the rotor core 111 is equipped is configured using insulation coated soft magnetic particles, an amorphous alloy, or a nanocrystalline alloy, respectively.

In the rotor core 111, plural holes extending along a direction parallel to a centerline O of the rotor core 111 (hereinafter simply called the z-axis direction) are formed. In the present embodiment, a case where the holes are through holes running through the rotor core 111 in the z-axis direction is described as an example.

The plural permanent magnets 112 are each installed (embedded) in the rotor core 111 by being inserted into the holes formed in the rotor core 111. FIG. 2 shows as an example a case where magnetic flux flows in and out from pole faces 201 (201a, 201b) of the permanent magnets 112. The direction orthogonal to the pole faces 201 (the direction of the double-arrowed line shown crossing the permanent magnets 112 in a radial direction of the rotor core 111 in FIG. 2) is a direction of magnetization Dm of the permanent magnets 112. The radial direction is a direction extending radially on the xy plane from the centerline O (the rotational axis of the rotor 110).

In the holes in which the permanent magnets 112 are installed, the regions where the permanent magnets 112 are not present serve as flux barriers 113 (113a to 113b). There are no tangible objects present in the flux barriers 113, and the flux barriers 113 are air gaps (in other words, regions of air). The flux barriers 113 are regions through which the magnetic flux does not pass or through which it is more difficult for the magnetic flux to pass than the surrounding regions. However, nonmagnetic bodies may be installed in the flux barriers 113. Furthermore, in the rotor core 111, holes 114 (114a to 114d) are formed in addition to the flux barriers 113. Holes 114a to 114c are formed to function as flux barriers or for rivets or the like (not shown in the drawings) to be installed therein. It will be noted that the rivets are, for example, used to secure the rotor 110 to end plates (not shown in the drawings) disposed on both ends of the rotor 110 in the z-axis direction. Furthermore, on the inner peripheral side of the rotor core 111 is formed a hole 114d running through the rotor core 111 in the z-axis direction. In the hole 114d is installed a shaft or the like (not shown in the drawings).

It will be noted that in the present embodiment a case where the shape of a cross-section of the rotor 110 as cut perpendicular to the centerline O of the rotor 110 (hereinafter called the rotor cross-section) has the shape shown in FIG. 2 in any position in the z-axis direction of the rotor 110 is described as an example.

Furthermore, FIG. 1 and FIG. 2 show as an example a case where the number of poles that the IPMSM 100 has is four. In FIG. 2, the range of the double-arrowed line indicated as "one pole" is a portion that configures one pole of the IPMSM 100. One permanent magnet 112 is embedded per pole, and a total of four permanent magnets are embedded in the hole portions of the rotor core 111. This number of poles and the number and arrangement of the permanent magnets 112 per pole are merely illustrative of an example and can be arbitrarily decided. In FIG. 2, only a portion configuring one pole of the rotor 110 is assigned reference signs, and reference signs for portions configuring the other three poles of the rotor 110 are omitted, because otherwise the notation would become complicated. It will be noted that when the number of poles that the IPMSM 100 has is n-poles (where n is an integer equal to or greater than 2; in the example shown in FIG. 1 and FIG. 2, n=4), the IPMSM 100 generally has a relationship of rotational symmetry with n-number of symmetries about the centerline O of the IPMSM 100 as the axis of rotational symmetry.

Figure 3:
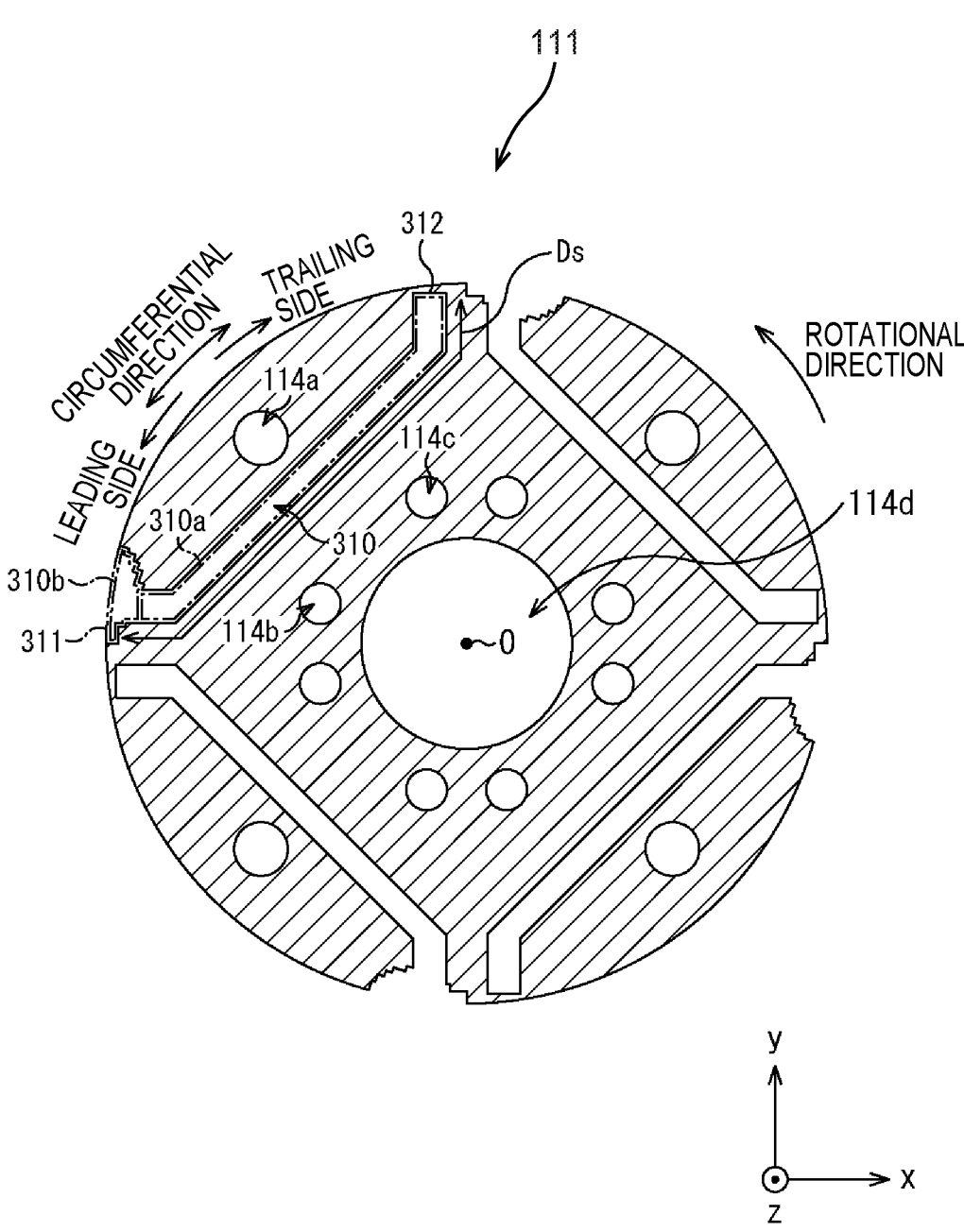
FIG. 3 is a view showing a first example of the configuration of a rotor core and corresponds to a rotor core of FIG. 2.

FIG. 3 is a view showing an example of the configuration of the rotor core 111. FIG. 3 also, like FIG. 1 and FIG. 2, is a sectional view of the rotor core 111 as cut perpendicular to the centerline O of the rotor core 111. It will be noted that the centerline O of the rotor core 111 is coincident with the centerline O of the IPMSM 100 and the centerline O of the rotor 110. Furthermore, in FIG. 3 also, as in FIG. 2, only a portion configuring one pole of the rotor core 111 is assigned reference signs, and reference signs for portions configuring the other three poles of the rotor core 111 are omitted.

In FIG. 3, in the rotor core 111, holes 310 including regions occupied by the permanent magnets 112 (hereinafter called magnet-occupied regions) and regions serving as the flux barriers 113 are formed.

In the cross-section of the rotor core 111 as cut perpendicular to the centerline O of the rotor core 111 (hereinafter called the rotor core cross-section), at least one of the holes 310 (in FIG. 3, all four holes 310) is open at a first end portion 311 positioned on a leading side in the rotational direction of the rotor core 111 among end portions in a left and right direction Ds, which is a direction on both left and right sides relative to the direction of magnetization Dm of the permanent magnets 112 in the centers of the permanent magnets 112. In the example shown in FIG. 3, the left and right direction Ds of the hole 310 is the lengthwise direction of the hole 310. In FIG. 3, the left and right direction Ds of the hole 310 is indicated by a double-arrowed line next to the hole 310. By contrast, in the rotor core cross-section, the hole 310 is not open at a second end portion 312 on the opposite side of the first end portion 311 (in other words, the trailing side in the rotational direction of the rotor core 111). Hereinafter, the leading side in the rotational direction of the rotor core 111 will also simply be called the leading side, and the trailing side in the rotational direction of the rotor core 111 will also simply be called the trailing side.

As mentioned above, in the present embodiment, a case where the number of poles that the IPMSM 100 has is four is described as an example. As shown in FIG. 3, in the present embodiment, a case where all four holes 310 in which the permanent magnets 112 are installed are open at the first end portion 311 is described as an example. However, at least one of the four holes 310 in which the permanent magnets 112 are installed may be open at the first end portion 311 of the hole 310. Furthermore, a case where all four holes 310 in which the permanent magnets 112 are installed are not open at the second end portion 312 is described as an example. However, at least one of the four holes 310 in which the permanent magnets 112 are installed may not be open at the second end portion 312.

In FIG. 1, a case where the IPMSM 100 is an inner rotor type is shown as an example. Furthermore, as shown in FIG. 1, the regions of the outer peripheral surface of the rotor 110 (the rotor core 111) apart from the holes 310 are end surfaces of the rotor 110 (the rotor core 111) that oppose the stator 120 across a gap.

Furthermore, the leading side in the rotational direction of the rotor core 111 is the leading position side of the permanent magnets 112 when viewed facing the rotational direction of the rotor 110, and the trailing side in the rotational direction of the rotor core 111 is the trailing position side of the permanent magnets 112. Specifically, in the example shown in FIG. 2, when viewed facing the rotational direction of the rotor 110, the leading position of the permanent magnets 112 is on a side surface 202 of the permanent magnets 112, and the trailing position of the permanent magnets 112 is on a side surface 203 of the permanent magnets 112. Consequently, the rotor core 111 is disposed in the rotor 110 so that the leading side in the rotational direction of the rotor core 111 is on the side surface 202 side of the permanent magnets 112 and the trailing side in the rotational direction of the rotor core 111 is on the side surface 203 side of the permanent magnets 112. It will be noted that the side surfaces 202, 203 of the permanent magnets 112 are, in the example shown in FIG. 2, end surfaces positioned on end portions in a direction orthogonal to the direction of magnetization Dm of the permanent magnets 12 among the end surfaces of the pole faces 201 (201a, 201b) of the permanent magnet 112.

Figure 4:
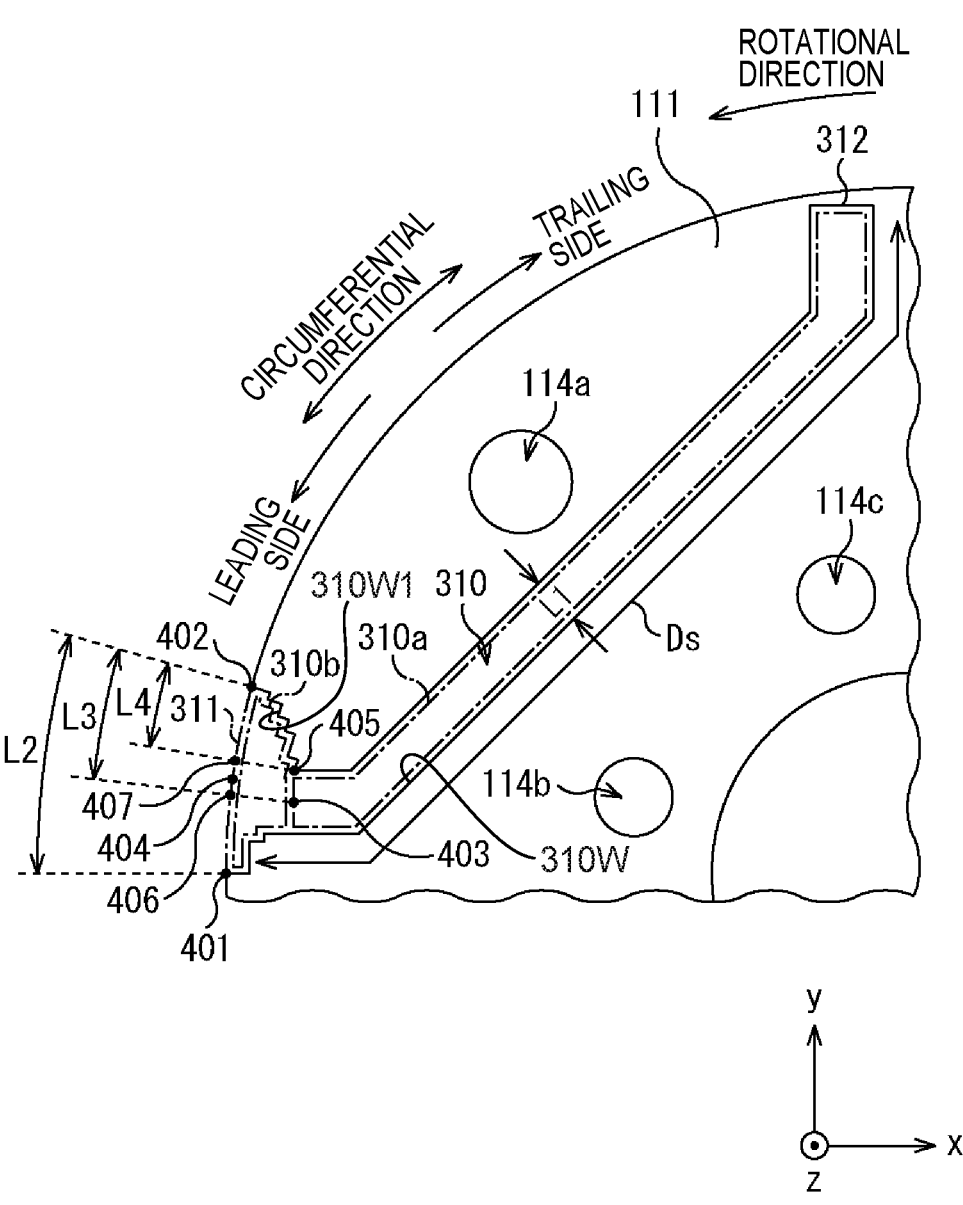
FIG. 4 is a view describing a first example of an inner space and a first outer space.

In FIG. 3, the hole 310 has an inner space 310a and a first outer space 310b. FIG. 4 is a view describing an example of the inner space 310a and the first outer space 310b.

The inner space 310a is, among the spaces configuring the hole 310 in the rotor cross-section, a space whose length in its width direction, which is a direction along the direction of magnetization Dm of the permanent magnet 112, is equal to a length L1 corresponding to the length of the permanent magnet 112 in the direction of magnetization Dm and substantially constant. As is clear by contrasting FIG. 2 with FIG. 3 and FIG. 4, the permanent magnet 112 is installed in the inner space 310a. Consequently, the width direction length of the magnet-occupied region of the hole 310 is the same as the width direction length L1 of the inner space 310a. The width direction length L1 of the inner space 310a may be the same as the length of the permanent magnet 112 in the direction of magnetization Dm or may be (slightly) longer than the length of the permanent magnet 112 in the direction of magnetization Dm to facilitate installation of the permanent magnet 112 in the hole 310. It will be noted that in the present embodiment a case where the length of the permanent magnet 112 in the direction of magnetization Dm is constant is described as an example. However, the length of the permanent magnet 112 in the direction of magnetization Dm need not always be constant. In a case where the length of the permanent magnet 112 in the direction of magnetization Dm is not constant, the width direction length of the inner space 310a may be made equal to a length corresponding to the length of the permanent magnet 112 in the direction of magnetization Dm and need not be constant.

The width direction of the hole 310 is a direction orthogonal to both the left and right direction Ds of the hole 310 (the direction indicated by the double-arrowed line next to the hole 310 in FIG. 3 and FIG. 4) and the depth direction of the hole 310 (the z-axis direction of the rotor core 111). Furthermore, as mentioned above, the direction of magnetization Dm of the permanent magnet 112 is a direction indicated by the direction of the double-arrowed line shown crossing the permanent magnet 112 in FIG. 2, and the width direction of the inner space 310a is coincident with the direction of magnetization Dm of the permanent magnet 112. It will be noted that as shown in FIG. 3, in a common IPMSM 100, in the rotor core 111, the length, in the left and right direction Ds, of the hole 310 in which the permanent magnet 112 is installed is longer than the width direction length of the hole 310, but the length of the hole 310 in the left and right direction Ds may be the same as the width direction length of the hole 310 or shorter than the width direction length of the hole 310.

The first outer space 310b is, among the spaces configuring the hole 310, a space that intercommunicates the inner space 310a with the outside of the rotor core 111. The first outer space 310b is, among the spaces configuring the hole 310, a space that communicates with the inner space 310a and has the first end portion 311 of the hole 310 as one end portion in the left and right direction Ds. Consequently, the end portion of the first outer space 310b on the outer peripheral side (in other words, the end portion on the opposite side of the side that communicates with the inner space 310a) is coincident with the first end portion 311 of the hole 310. There is no outer space on the trailing side of the inner space 310a; rather, the end portion of the trailing side thereof is coincident with the second end portion 312 of the hole 310. In other words, in the rotor core cross-section, the second end portion 312 of the hole 310 is not open. The circumferential direction length of the first end portion 311 of the hole 310 is L2.

It will be noted that the circumferential direction length L2 of the first end portion 311 of the hole 310 is a length in the circumferential direction in a direction heading toward the trailing side from an endpoint 401 of the first end portion 311 of the hole 310 on the leading side to an endpoint 402 of the first end portion 311 of the hole 310 on the trailing side. The circumferential direction length L2 of the first end portion 311 of the hole 310 may approximate the width direction length of the first end portion 311 of the hole 310. The width direction length of the first end portion 311 of the hole 310 is the linear distance between the endpoint 401 of the first end portion 311 of the hole 310 on the leading side and the endpoint 402 of the first end portion 311 of the hole 310 on the trailing side.

Figure 5A:
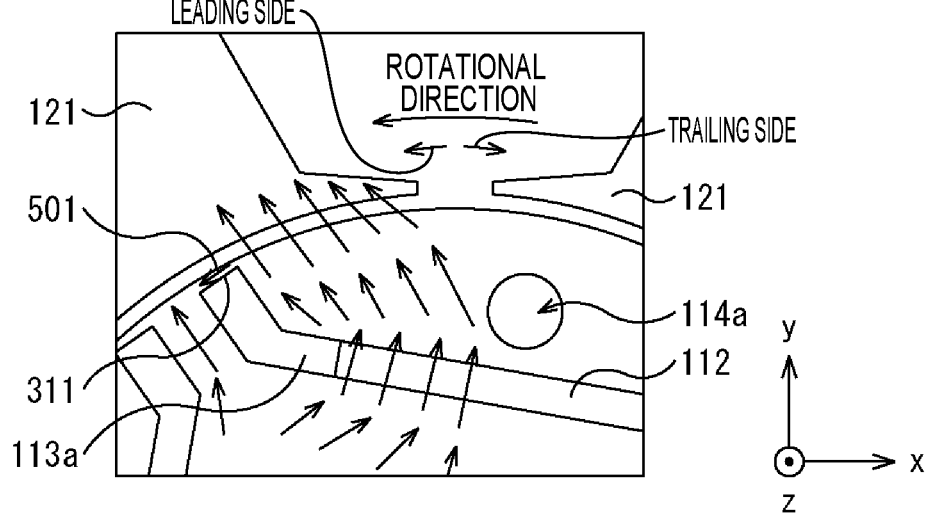
FIG. 5A is a view describing an example of differences in the flow of magnetic flux due to differences in a first end portion of a hole.
Figure 5B:
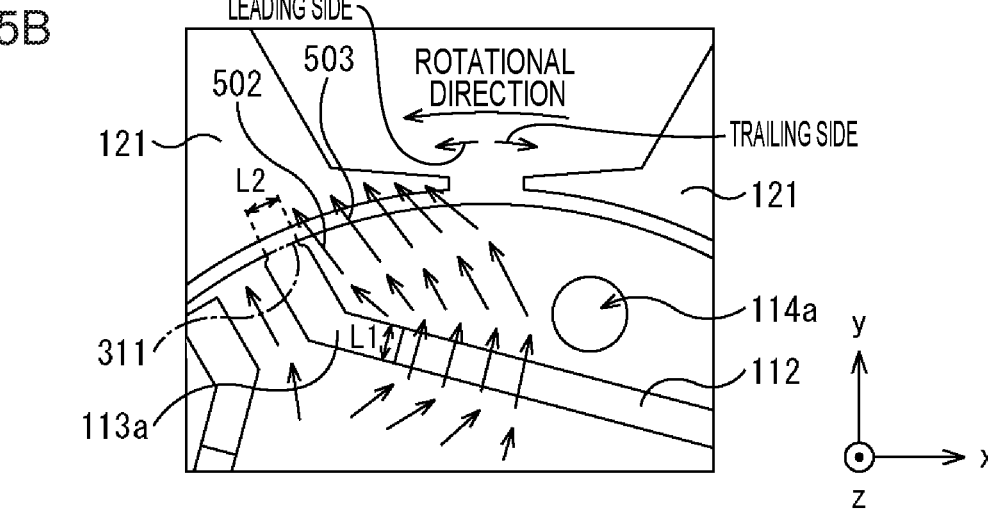
FIG. 5B is a view describing an example of differences in the flow of magnetic flux due to differences in the first end portion of the hole.
Figure 5C:
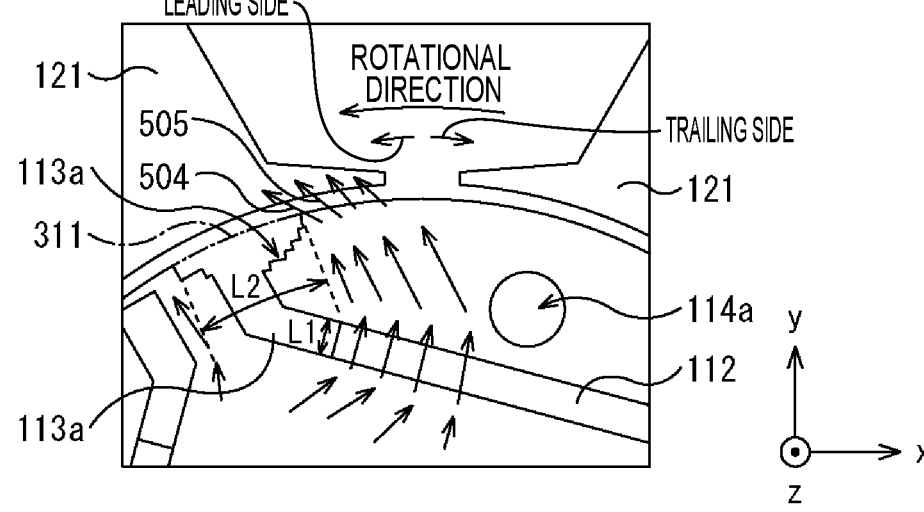
FIG. 5C is a view describing an example of differences in the flow of magnetic flux due to differences in the first end portion of the hole.

As shown in FIG. 4, in the present embodiment, the circumferential direction length L2 of the first end portion 311 of the hole 310 is made longer than the width direction length L1 of the inner space 310a. The reasons that led to doing so are explained below. FIG. 5A, FIG. 5B, and FIG. 5C are views describing differences in the flow of magnetic flux due to differences in the first end portion 311 of the hole 310. It will be noted that the magnetic fluxes represented by the arrowed lines in FIG. 5A, FIG. 5B, and FIG. 5C are conceptually notated fluxes and, for example, the length and number of the arrowed lines do not necessarily correspond to the magnitudes and magnetic flux densities of the magnetic fluxes.

FIG. 5A, FIG. 5B, and FIG. 5C show an enlargement of the vicinity of the first end portion 311 of the hole 310 when the IPMSM 100 is operating.

FIG. 5A shows the flow of magnetic flux in a case assuming that the first end portion 311 of the hole 310 does not communicate with the outer peripheral surface of the rotor core 111. As shown in FIG. 5A, when the first end portion 311 of the hole 310 is not open, the region on the outer side of the first end portion 311 of the hole 310 is the soft magnetic body such as electromagnetic steel sheets, and whereas the region on the inner side of the first end portion 311 of the hole 310 functions as a flux barrier, the region of the soft magnetic body serves as a bridge portion, giving rise to a magnetic flux 501 that recirculates in the rotor core 111 without proceeding to the stator core 121. For this reason, the torque of the IPMSM 100 cannot be sufficiently increased.

FIG. 5B shows the flow of magnetic flux in a case where the circumferential direction length L2 of the first end portion 311 of the hole 310 is substantially the same as the width direction length L1 of the inner space 310a of the hole 310. As shown in FIG. 5B, when the first end portion 311 of the hole 310 is open, almost no recirculation of the magnetic flux via the bridge portion such as shown in FIG. 5A occurs. Consequently, the recirculating magnetic flux inclines relative to the radial direction of the IPMSM 100 and proceeds toward the stator core 121, whereby the torque of the IPMSM 100 can be increased. However, because the circumferential direction length L2 of the first end portion 311 of the hole 310 is short, a magnetic flux that passes through the flux barrier 113a may be generated.

FIG. 5C shows the flow of magnetic flux in a case where, as shown in FIG. 1 to FIG. 4, the circumferential direction length L2 of the first end portion 311 of the hole 310 is longer than the width direction length L1 of the inner space 310a of the hole 310. As shown in FIG. 5C, by making the circumferential direction length L2 of the first end portion 311 of the hole 310 longer than the width direction length L1 of the inner space 310a, the generation of a magnetic flux that passes through the flux barrier 113a can be more reliably reduced.

Moreover, it is preferred that the circumferential direction length L2 of the first end portion 311 of the hole 310 be made longer than the width direction length L1 of the inner space 310a by making the circumferential direction length of the region of the first end portion 311 of the hole 310 on the trailing side longer. By doing so, in the region of the soft magnetic body on the trailing side of the flux barrier 113a, more magnetic flux whose angle heading from the radial direction of the IPMSM 100 (i.e., the direction extending radially on the xy plane from the centerline O) toward the leading side in the circumferential direction becomes larger can be generated (this corresponds to the directions of magnetic fluxes 504, 505 shown in FIG. 5C inclining more toward the leading side in the circumferential direction than the directions of magnetic fluxes 502, 503 shown in FIG. 5B). That is, when magnetic flux density vectors representing the magnetic fluxes 504, 505 shown in FIG. 5C are represented by an r-$\theta$ coordinate system (a two-dimensional polar coordinate system) with the centerline O as the origin, $\theta$ components $B_\theta$ of the magnetic flux density vectors resulting from the magnetic fluxes 504, 505 become larger. This has the effect of increasing the reluctance torque of the IPMSM 100 and contributes to increasing the torque of the IPMSM 100.

This is also shown from the following. That is, when a calculational equation for finding a torque T from Maxwell stress tensors described in *Yūgenyōsohō ni yoru kōchaku denjishaku no sekkei to ōyō* (August 1991, Morikita Publishing Co., Ltd.), by NAKATA Takayoshi and ITŌ Shōkichi, is converted to an r-$\theta$ coordinate system, the torque T is given by the following equation (1).

[Equation 1]

$$T = \frac{LR^2}{\mu_0} \int_0^{2\pi} B_\gamma B_\theta d\theta \qquad (1)$$

Here, L is the height of the rotor core (the length in the z-axis direction). In a case where the rotor core (specifically, the soft magnetic body of the rotor core) comprises electromagnetic steel sheets, L is the stack thickness of the electromagnetic steel sheets. R is the radius of the rotor core. $\mu_0$ is the permeability of a vacuum. $B_r$ is the r component (i.e., the radial component) of the magnetic flux density vector. $B_\theta$ is the $\theta$ component (i.e., the declination component) of the magnetic flux density vector. Here, the $\theta$ direction is a positive direction in the counterclockwise direction as one faces the page in FIG. 5A, FIG. 5B, and FIG. 5C and is coincident with the rotational direction in the present embodiment, so it can be understood that, as shown in equation (1), the torque T increases when the $\theta$ component $B_\theta$ of the magnetic flux density vector increases.

Thus, it is preferred that the first end portion 311 of the hole 310 be configured as follows.

First, in FIG. 4, the first outer space 310b of the hole 310 is a wider region than the inner space 310a of the hole 310. Furthermore, it is preferred that the first end portion 311 of the hole 310 be off-center on the trailing side in the circumferential direction relative to a center position 403 of the inner space 310a at the position (boundary) where the inner space 310a communicates with the first outer space 310b. That is, it is preferred that a circumferential direction center position 404 of the first end portion 311 of the hole 310 be positioned on the trailing side, in the circumferential direction, of the circumferential direction center position 403 of the inner space 310a at the position where the inner space 310a communicates with the first outer space 310b. This corresponds, in FIG. 4, to the circumferential direction center position 404 of the first end portion 311 of the hole 310 being positioned on the trailing side, in the circumferential direction, of an extrapolated center position 406 of the inner space 310a of the hole 310. The extrapolated center position 406 of the inner space 310a of the hole 310 is the position of an intersection between the first end portion 311 of the hole 310 and a straight line extending along the radial direction of the rotor core 111 from the center position 403 of the inner space 310a at the position (boundary) where the inner space 310a communicates with the first outer space 310b (the dashed line extending from the center position 403 in FIG. 4). By doing so, a space recessed on the centerline O side of the outer peripheral surface of the other region of the rotor core 111 can be formed on the trailing side of an endpoint 405 of the inner space 310a on the trailing side. Consequently, in the soft magnetic body on the trailing side of the first outer space 310b, a flux density vector with a large positive θ component can be increased. FIG. 4 shows as an example a case where this is done.

Furthermore, in a case where this is done, it is more preferred that a circumferential direction length L3 in a direction heading toward the trailing side from the extrapolated center position 406 of the inner space 310a of the hole 310 to the endpoint 402 of the first end portion 311 of the hole 310 on the trailing side be equal to or greater than the width direction length L1 of the inner space 310a (L3≥L1). By doing so, the space recessed on the centerline O side of the outer peripheral surface of the other region of the rotor core 111 can be made larger on the trailing side of the endpoint 405 of the inner space 310a on the trailing side. Consequently, the magnetic flux density vector with a large θ component can be further increased on the trailing side of the flux barrier 113a (the first outer space 310b). FIG. 4 shows as an example a case where this is done.

Moreover, it is even more preferred that a circumferential direction length L4 in a direction heading toward the trailing side from a trailing side endpoint extrapolated position 407 of the inner space 310a of the hole 310 to the endpoint 402 of the first end portion 311 of the hole 310 on the trailing side be equal to or greater than the width direction length L1 of the inner space 310a (L4≥L1). The trailing side endpoint extrapolated position 407 of the inner space 310a of the hole 310 is the position of an intersection between the first end portion 311 of the hole 310 and a straight line extending along the radial direction of the rotor core 111 from the endpoint 405 of the inner space 310a on the trailing side at the position where the inner space 310a communicates with the first outer space 310b (the dashed line extending from the endpoint 405 in FIG. 4). By doing so, the space recessed on the centerline O side of the outer peripheral surface of the other region of the rotor core 111 can be made even larger on the trailing side of the endpoint 405 of the inner space 310a on the trailing side. Consequently, magnetic flux density vectors having a large θ component can be increased even more on the trailing side of the flux barrier 113a (the first outer space 310b). FIG. 4 shows as an example a case where this is done.

Figure 6:
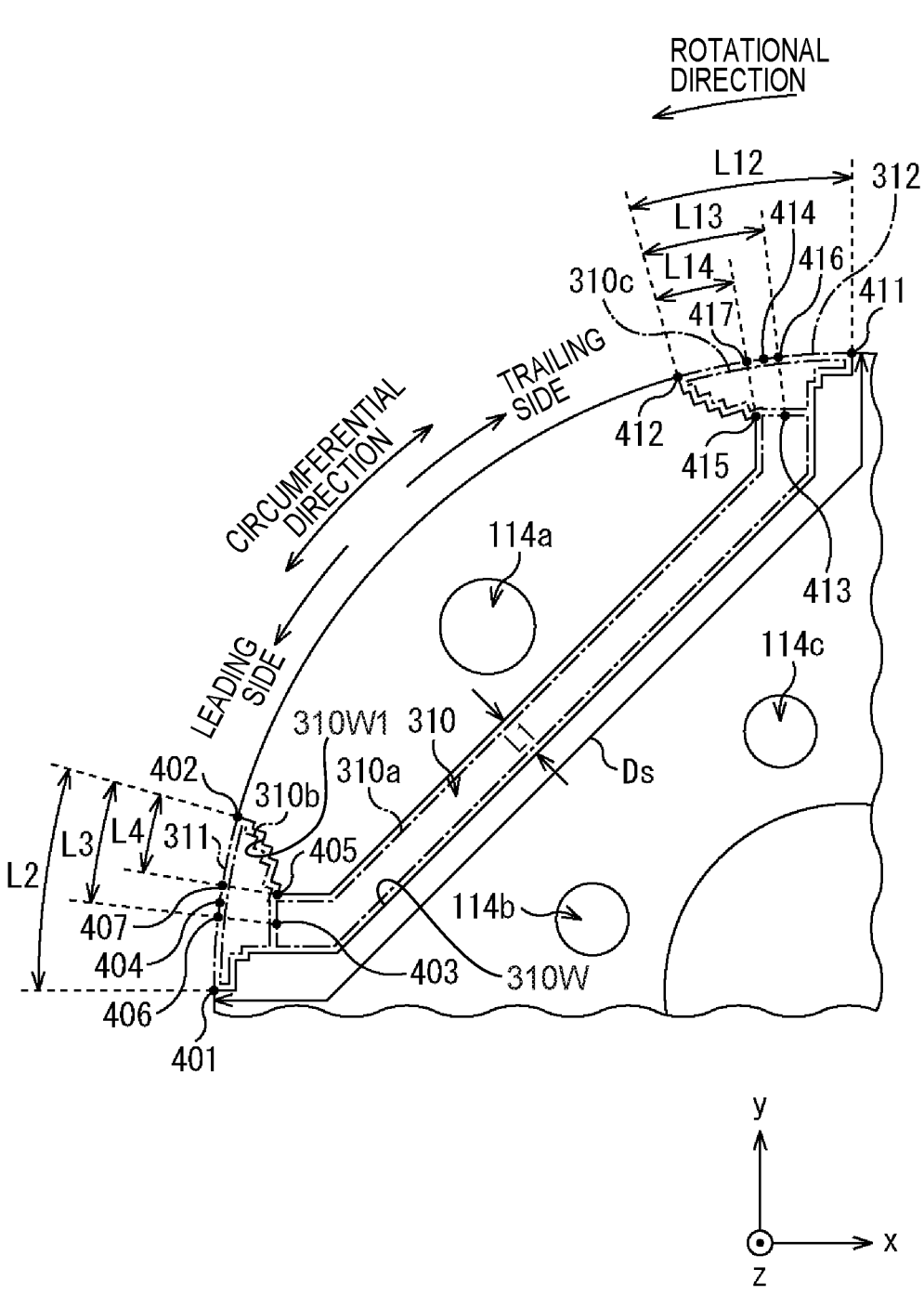
FIG. 6 is a view describing an example of the inner space, the first outer space, and a second outer space.

Furthermore, as shown in FIG. 4, in a hole wall surface 310W configuring the hole 310, a trailing side wall surface 310W1 forming the trailing side of the first outer space 310b in the rotational direction is inclined relative to a direction (the radial direction) orthogonal to the centerline O. Specifically, as shown in FIG. 4 and FIG. 6, the trailing side wall surface 310W1 is formed such that the width direction length of the hole 310 gradually increases toward the outer peripheral side. Furthermore, the trailing side wall surface 310W1 is concavely curved. It will be noted that the concavely curved portion formed on the trailing side wall surface 310W1 may be in at least part of the trailing side wall surface 310W1. Specifically, the trailing side wall surface 310W1 is formed in a stepped shape so as to concavely curve relative to a virtual straight line interconnecting the endpoint 402 and the endpoint 405. For example, the steps may have a portion intersecting the imaginary straight line, but the portion on the trailing side and/or the radial direction inner side relative to the virtual straight line should be longer than the portion on the opposite side. It will be noted that the present disclosure is not limited to this configuration, and the trailing side wall surface 310W1 may be linear (coincident with the virtual straight line) or may be curved (a curved surface that curves in the shape of an arc relative to the virtual straight line).

Here, because the trailing side wall surface 310W1 is inclined relative to a direction (the radial direction) orthogonal to the centerline O, the magnetic resistance of that portion of the soft magnetic body on the trailing side of the first outer space 310b can be increased, so magnetic flux density vectors having a large positive θ component can be increased. Because of this, the reluctance torque can be increased.

Moreover, by concavely curving the trailing side wall surface 310W1, the magnetic resistance of that portion can be increased even more, so magnetic flux density vectors having a large positive θ component can be increased even more.

It will be noted that the shape and radial direction length of the first outer space 310b are not limited to what is shown in FIG. 3 and FIG. 4. For example, the shape and radial direction length of the first outer space 310b may be decided based on the results of an electromagnetic field analysis on the IPMSM 100 so that the torque T of the IPMSM 100 increases when the first outer space 310b is formed in the way described above compared to a case where it is not formed.

As mentioned above, the second end portion 312 of the hole 310 does not communicate with the outer peripheral surface of the rotor core 111 (in other words, the end surface that opposes the stator 120 across a gap). Consequently, as shown in FIG. 4, the end portion of the inner space 310a on the trailing side in the left and right direction Ds is coincident with the second end portion 312 of the hole 310. In the rotor core 111 shown in FIG. 3, if the second end portion 312 of the hole 310 were open, the region of the rotor core 111 on the outer peripheral side of the hole 310 would become isolated, and the rotor core 111 would have a shape in which that region would be floating in midair. Then, the mechanical strength of the rotor core 111 would be reduced. In this case, for example, a measure such as disposing a nonmagnetic material in the second end portion 312 of the hole 310 to connect the region on the outer peripheral side of the rotor core 111 to the region on the inner peripheral side would become necessary, and due to manufacturing difficulties, cases arise where this arrangement cannot be employed as is. Thus, in the present embodiment, the second end portion 312 of the hole 310 is not open.

Here, the reason the first end portion 311 of the hole 310 is open rather than the second end portion 312 of the hole 310 is because doing so can increase the positive component of the magnetic flux density vector Be in the θ direction more than in a case where the second end portion 312 of the hole 310 is open rather than the first end portion 311 of the hole 310. This will be described below.

Figure 7A:
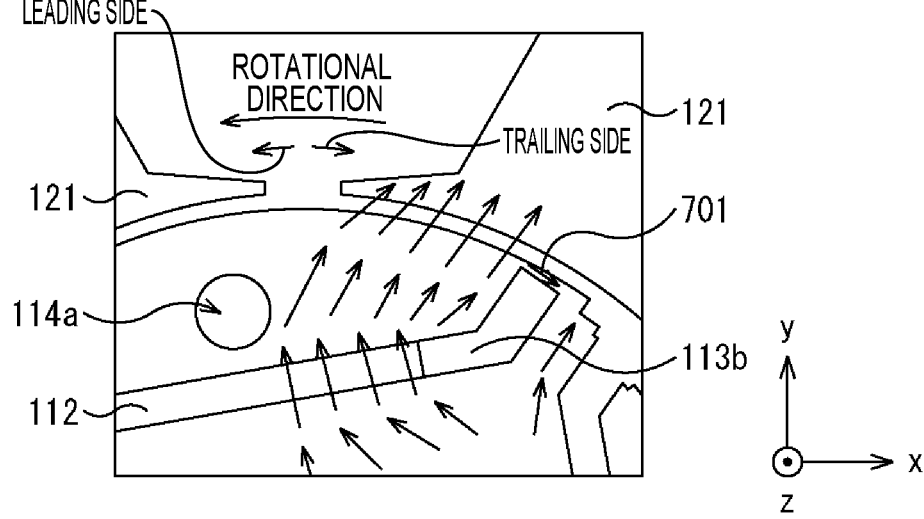
FIG. 7A is a view describing an example of differences in the flow of magnetic flux due to differences in a second end portion of the hole.
Figure 7B:
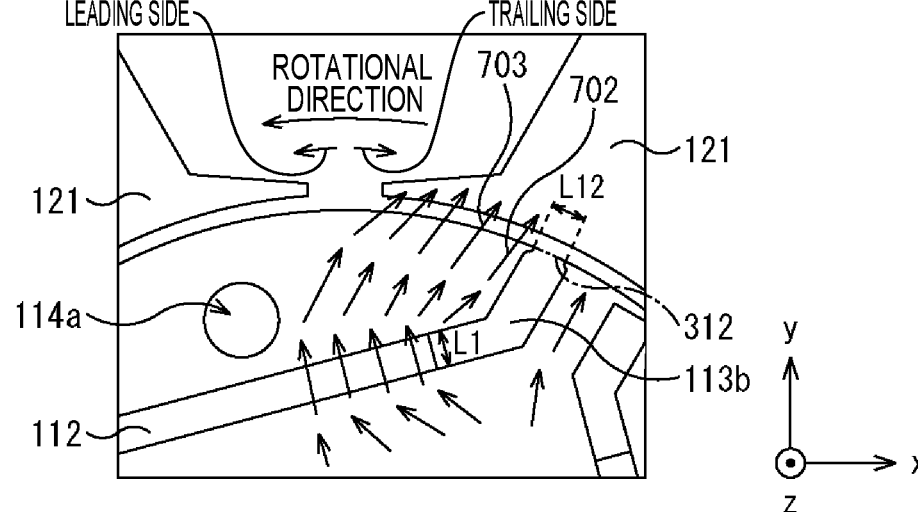
FIG. 7B is a view describing an example of differences in the flow of magnetic flux due to differences in the second end portion of the hole.
Figure 7C:
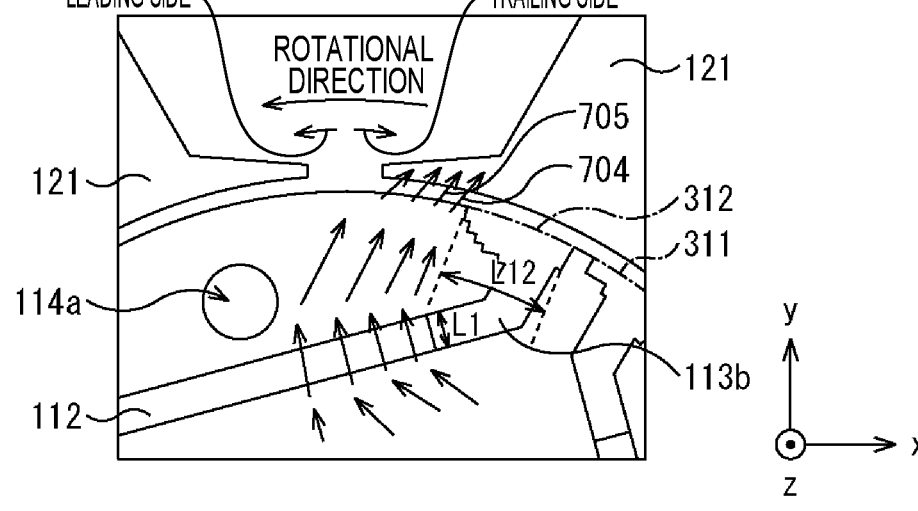
FIG. 7C is a view describing an example of differences in the flow of magnetic flux due to differences in the second end portion of the hole.

FIG. 6 is a view describing an example of the inner space 310a, the first outer space 310b, and a second outer space 310c and corresponds to FIG. 4. FIG. 7A, FIG. 7B, and FIG. 7C are views describing differences in the flow of magnetic flux due to differences in the second end portion 312 of the hole 310, and FIG. 7A, FIG. 7B, and FIG. 7C correspond to FIG. 5A, FIG. 5B, and FIG. 5C, respectively. That is, FIG. 7A shows the flow of magnetic flux in a case where the second end portion 312 of the hole 310 is not open as shown in FIG. 3 and FIG. 4. FIG. 7B shows the flow of magnetic flux in a case where the second end portion 312 of the hole 310 is open and a circumferential direction length L12 of the second end portion 312 of the hole 310 is substantially the same as the width direction length L1 of the inner space 310*a* of the hole 310. FIG. 7C shows the flow of magnetic flux in a case where the second end portion 312 of the hole 310 is open and the circumferential direction length L12 of the second end portion 312 of the hole 310 is longer than the width direction length L1 of the inner space 310*a* of the hole 310. It will be noted that in FIG. 7A, FIG. 7B, and FIG. 7C also, as in FIG. 5A, FIG. 5B, and FIG. 5C, the magnetic fluxes indicated by the arrowed lines are conceptually notated fluxes and, for example, the length and number of the arrowed lines do not necessarily correspond to the magnitudes and magnetic flux densities of the magnetic fluxes.

As shown in FIG. 7A, in a case where the second end portion 312 of the hole 310 is not open, the region on the outer side of the second end portion 312 of the hole 310 is the soft magnetic body such as electromagnetic steel sheets, and whereas the region on the inner side of the second end portion 312 of the hole 310 functions as a flux barrier, the region of the soft magnetic body serves as a bridge portion, giving rise to a magnetic flux 701 that recirculates in the rotor core 111 without proceeding to the stator core 121. For this reason, the torque of the IPMSM 100 cannot be increased by that amount. However, as mentioned above, in order for the region of the rotor core 111 on the outer peripheral side of the hole 310 to not have a shape that would be floating in midair, in the present embodiment, the second end portion 312 of the hole 310 is not open.

Here, as shown in FIG. 6, let it be assumed that in the second end portion 312 of the hole 310 also, a second outer space 310*c* that is the same as the first outer space 310*b* of the first end portion 311 of the hole 310 is formed, and that a circumferential direction length L12 of the second end portion 312 of the hole 310 is longer than the width direction length L1 of the inner space 310*a*. It will be noted that the circumferential direction length L12 of the end portion 312 on the trailing side of the rotor core 111 is a length in the circumferential direction heading in a direction toward the leading side from an endpoint 411 of the second end portion 312 of the hole 310 on the trailing side to an endpoint 412 of the second end portion 312 of the hole 310 on the leading side. The circumferential direction length L12 of the end portion 312 on the trailing side of the rotor core 111 may approximate the width direction length of the end portion 312 (the linear distance between the endpoint 411 and the endpoint 412) on the trailing side of the rotor core 111.

In a case where this is assumed, it is preferred that the second end portion 312 of the hole 310 be off-center on the leading side in the circumferential direction relative to a center position 413 of the inner space 310*a* at the position where the inner space 310*a* communicates with the second outer space 310*c*. That is, it would be preferred that a circumferential direction center position 414 of the second end portion 312 of the hole 310 be on the leading side in the circumferential direction relative to the circumferential direction center position 413 of the inner space 310*a* at the position where the inner space 310*a* communicates with the second outer space 310*c*. This corresponds, in FIG. 6, to the circumferential direction center position 414 of the second end portion 312 of the hole 310 being positioned on the leading side in the circumferential direction relative to an extrapolated center position 416 of the inner space 310*a* of the hole 310. The extrapolated center position 416 of the inner space 310*a* of the hole 310 is the position of an intersection between the second end portion 312 of the hole 310 and a straight line extending along the radial direction of the rotor core 111 from the center position 413 of the inner space 310*a* at the position (boundary) where the inner space 310*a* communicates with the second outer space 310*c* (the dashed line extending from the center position 413 in FIG. 6).

Furthermore, in a case where this is done, it would be more preferred that a circumferential direction length L13 in a direction heading toward the leading side from the extrapolated center position 416 of the inner space 310*a* of the hole 310 to the endpoint 412 of the second end portion 312 of the hole 310 on the leading side be equal to or greater than the width direction length L1 of the inner space 310*a* (L13≥L1). Moreover, it would be even more preferred that a circumferential direction length L14 in a direction heading toward the leading side from a leading side endpoint extrapolated position 417 of the inner space 310*a* of the hole 310 to the endpoint 412 of the second end portion 312 of the hole 310 on the leading side be equal to or greater than the width direction length L1 of the inner space 310*a* (L14≥L1). The leading side endpoint extrapolated position 417 of the inner space 310*a* of the hole 310 is the position of an intersection between the second end portion 312 of the hole 310 and a straight line extending along the radial direction of the rotor core 111 from an endpoint 415 of the inner space 310*a* on the leading side at the position where the inner space 310*a* communicates with the second outer space 310*c* (the dashed line extending from the endpoint 415 in FIG. 4).

By forming the first outer space 310*b* as shown in FIG. 4 and FIG. 6, the region of the first outer space 310*b* on the trailing side expands. For this reason, compared to a case where, as shown in FIG. 5B, the circumferential direction length L2 of the first end portion 311 of the hole 310 is substantially the same as the width direction length of the magnet-occupied region of the hole 310 (i.e., the width direction length of the inner space 310*a*), the magnetic flux in the position near the endpoint 402 on the trailing side of the first outer space 310*b* travels from the trailing side (i.e., the rear side relative to the rotational direction of the rotor core 111) toward the stator core 121 (see the magnetic fluxes 502, 503 shown in FIG. 5B and the magnetic fluxes 504, 505 shown in FIG. 5C). Because the rotor core 111 rotates toward the leading side, the direction of travel of the magnetic fluxes 504, 505 is inclined a large extent relative to the direction of travel of the magnetic fluxes 502, 503, and the positive component in the θ direction of the magnetic flux density vectors represented by the magnetic fluxes 504, 505 increases.

In contrast, by forming the second outer space 310*c* as shown in FIG. 6, the region on the leading side of the second outer space 310*c* expands. For this reason, compared to a case where, as shown in FIG. 7B, the circumferential direction length L12 of the second end portion 312 of the hole 310 is substantially the same as the width direction length of the magnet-occupied region of the hole 310 (i.e., the width direction length of the inner space 310*a*), the magnetic flux in the position near the endpoint 412 on the leading side of the second outer space 310*c* travels from the leading side (i.e., the front side relative to the rotational direction of the rotor core 111) toward the stator core 121 (see the magnetic fluxes 702, 703 shown in FIG. 7B and the magnetic fluxes 704, 705 shown in FIG. 7C). However, because the rotor core 111 rotates toward the leading side, the direction of travel of the magnetic fluxes 704, 705 is not inclined a great extent compared to the magnetic fluxes 504, 505 shown in FIG. 5C, and the margin of increase in the positive component in the θ direction of the magnetic flux density vectors represented by the magnetic fluxes 704, 705 also becomes smaller than that of the θ component of the magnetic flux density vectors represented by the magnetic fluxes 504, 505 shown in FIG. 5C. Moreover, in a case where the second outer space 310c is formed so that L12>L1 as shown in FIG. 6, the margin of the reduction in the mechanical strength of the rotor core 111 increases and manufacturing difficulties also increase.

As described above, because the rotor core 111 rotates toward the leading side, the direction of travel of the magnetic flux can be inclined a larger extent relative to the radial direction of the IPMSM 100 when the recirculation of the magnetic flux via a bridge portion such as shown in FIG. 5A is directed to the stator core 121 such as shown in FIG. 5C than when the recirculation of the magnetic flux via a bridge portion such as shown in FIG. 7A is directed to the stator core 121 as shown in FIG. 7C, and the positive component in the θ direction of the magnetic flux density vectors can be increased.

For the above reasons, in the present embodiment, the first end portion 311 of the hole 310, and not the second end portion 312 of the hole 310, is open.

As described above, in the present embodiment, in the rotor core cross-section, at least one hole 310 of the holes 310 in which the permanent magnets 112 are installed is open at the first end portion 311. Furthermore, the circumferential direction length L2 of the first end portion 311 of the hole 310 (i.e., the circumferential direction length of the opening of the first end portion 311) is longer than the circumferential direction length of the opening of the second end portion 312. Consequently, at the first end portion 311 side of the hole 310, the magnetic flux 501 recirculating in the rotor core 111 can be inhibited and the reluctance torque can be increased. Thus, the torque T of the IPMSM 100 can be increased.

Furthermore, in the present embodiment, in the rotor core cross-section, the second end portion 312 of the hole 310 is not open, so the circumferential direction length L2 of the first end portion 311 of the hole 310 (i.e., the circumferential direction length of the opening of the first end portion 311) is longer than the circumferential direction length of the opening of the second end portion 312. Consequently, the torque T of the IPMSM 100 and the mechanical strength of the rotor core 111 can be increased without using a non-magnetic body or the like.

Furthermore, in the present embodiment, in the rotor core cross-section, the circumferential direction length L2 of the first end portion 311 of the hole 310 is longer than the length of the permanent magnet 112 in the direction of magnetization Dm (i.e., the width direction length of the magnet-occupied region of the hole 310 (the width direction length of the inner space 310a)). Consequently, on the first end portion 311 side of the hole 310 in the left and right direction Ds, the magnetic flux 501 recirculating in the rotor core 111 can be reliably inhibited and the reluctance torque can be reliably increased.

Furthermore, in the present embodiment, in the rotor core cross-section, the first end portions 311 of all the holes 310 are open. Consequently, on the first end portion 311 side of each of the holes 310, the magnetic flux 501 recirculating in the rotor core 111 can be more reliably inhibited and the reluctance torque can be more reliably increased.

Furthermore, in the present embodiment, in the rotor core cross-section, the first end portion 311 of the hole 310 is off-center on the trailing side in the circumferential direction relative to the center position 403 of the inner space 310a at the position where the inner space 310a communicates with the first outer space 310b. Consequently, on the first end portion 311 side of the hole 310, the reluctance torque can be increased more.

Furthermore, in the present embodiment, in the rotor core cross-section, the circumferential direction length L4 in a direction heading toward the trailing side from the trailing side endpoint extrapolated position 407 of the inner space 310a of the hole 310 to the endpoint 402 of the first end portion 311 of the hole 310 on the trailing side is equal to or greater than the width direction length L1 of the inner space 310a (L4≥L1). Consequently, on the first end portion 311 side of the hole 310, the reluctance torque can be increased even more.

Second Embodiment

Next, a second embodiment will be described. In the first embodiment, a case where, in the rotor core cross-section, the second end portion 312 of the hole 310 in which the permanent magnet 112 is installed is not open was described as an example. By contrast, in the present embodiment, a case where, in the rotor core cross-section, the second end portion of the hole in which the permanent magnet 112 is installed is open will be described. In this way, the present embodiment and the first embodiment differ mainly in the second end portion 312 of the hole 310. Consequently, in the description of the present embodiment, parts that are identical to those in the first embodiment are assigned reference signs that are identical to the reference signs in FIG. 1 to FIG. 7C, and detailed description thereof will be omitted.

Figure 8:
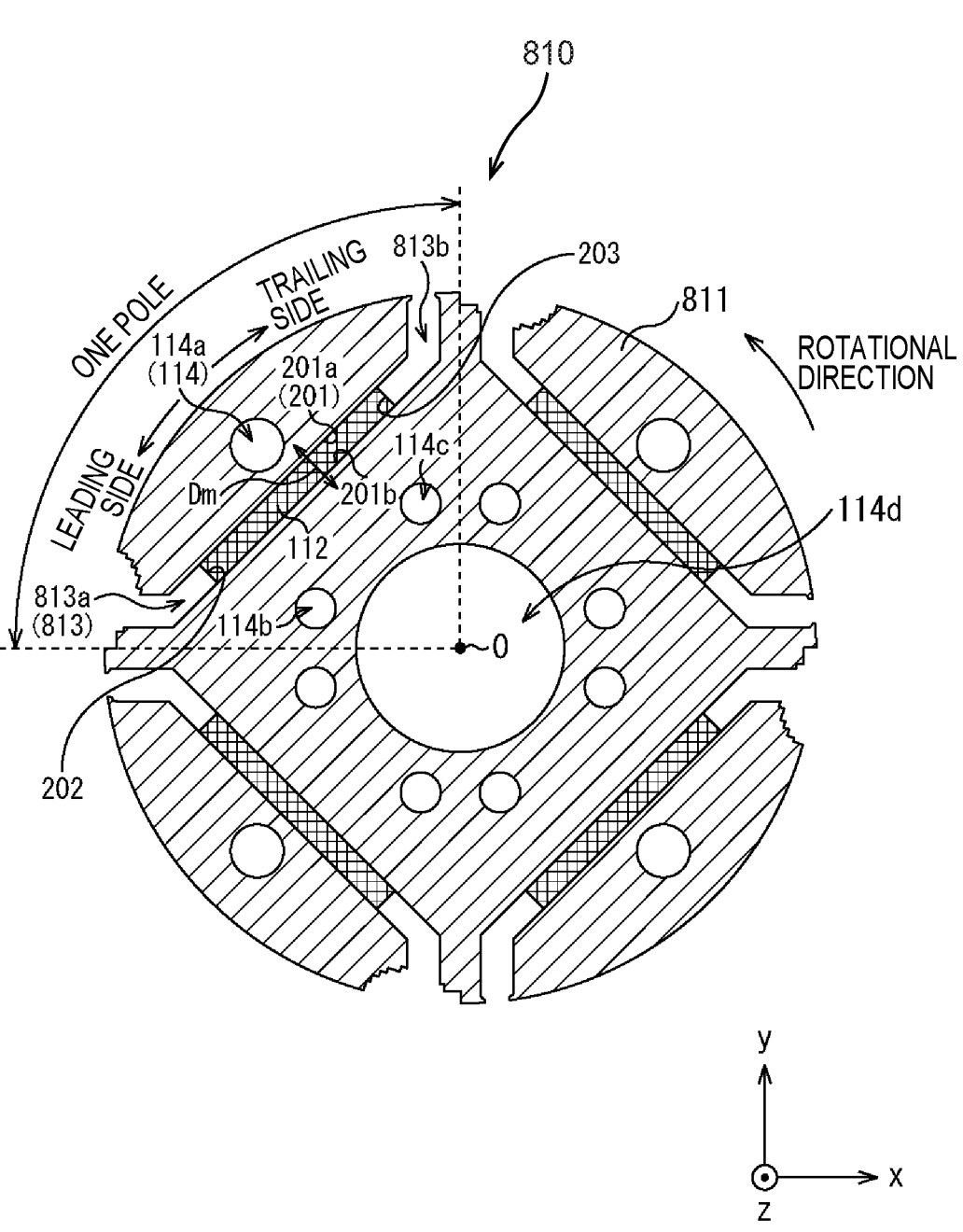
FIG. 8 is a view showing a second example of the configuration of a rotor.

In the present embodiment, the rotor 110 shown in FIG. 2 is changed as follows. FIG. 8 is a view showing an example of the configuration of a rotor 810. FIG. 8 is a sectional view of the rotor 810 as cut perpendicular to a centerline O of the rotor 810 and corresponds to FIG. 2. In the present embodiment also, as in the first embodiment, a case where the rotor 810 rotates in the direction of the arrowed line shown in FIG. 8 (i.e., the counterclockwise direction as one faces the page) and where the rotor 810 does not rotate in the opposite direction of the direction of the arrowed line shown in FIG. 8 (i.e., the clockwise direction as one faces the page) is described as an example.

The rotor 810 includes a rotor core 811 and plural permanent magnets 112. The rotor core 811 includes a soft magnetic body and plural hole portions. The soft magnetic body is, for example, configured by stacking plural electromagnetic steel sheets on the centerline O of the rotor 810. However, it is not always necessary for the soft magnetic body to be configured by stacking plural electromagnetic steel sheets. As described as an example in the first embodiment, it may also be configured by other soft magnetic materials.

In the holes in which the permanent magnets 112 are installed, the regions where the permanent magnets 112 are not present serve as flux barriers 813 (813a to 813b). The differences between the rotor 110 shown in FIG. 2 and the rotor 810 shown in FIG. 8 are the shape and size of the flux barrier 813b. It will be noted that the flux barrier 113a shown in FIG. 2 and the flux barrier 813a shown in FIG. 8 are the same. As described in the first embodiment, the flux barriers 813a to 813b may be air gaps (i.e., regions of air) or may have nonmagnetic bodies installed in them. However, it is preferred that, for example, a nonmagnetic body be installed in part or all of the region of the flux barrier 813b, so that the region on the outer peripheral side of the flux barriers 813 of the rotor core 811 does not become isolated and the region does not have a shape that floats in midair.

It will be noted that in the present embodiment also, as in the first embodiment, a case where the shape of the rotor cross-section has the shape shown in FIG. 8 in any position in the z-axis direction of the rotor 810 is described as an example.

Furthermore, FIG. 8 shows as an example a case where, as in the first embodiment, the number of poles that the IPMSM has is four. In FIG. 8 also, as in FIG. 2, only a portion configuring one pole of the rotor 810 is assigned reference signs, and reference signs for portions configuring the other three poles of the rotor 810 are omitted, because otherwise the notation would become complicated.

Figure 9:
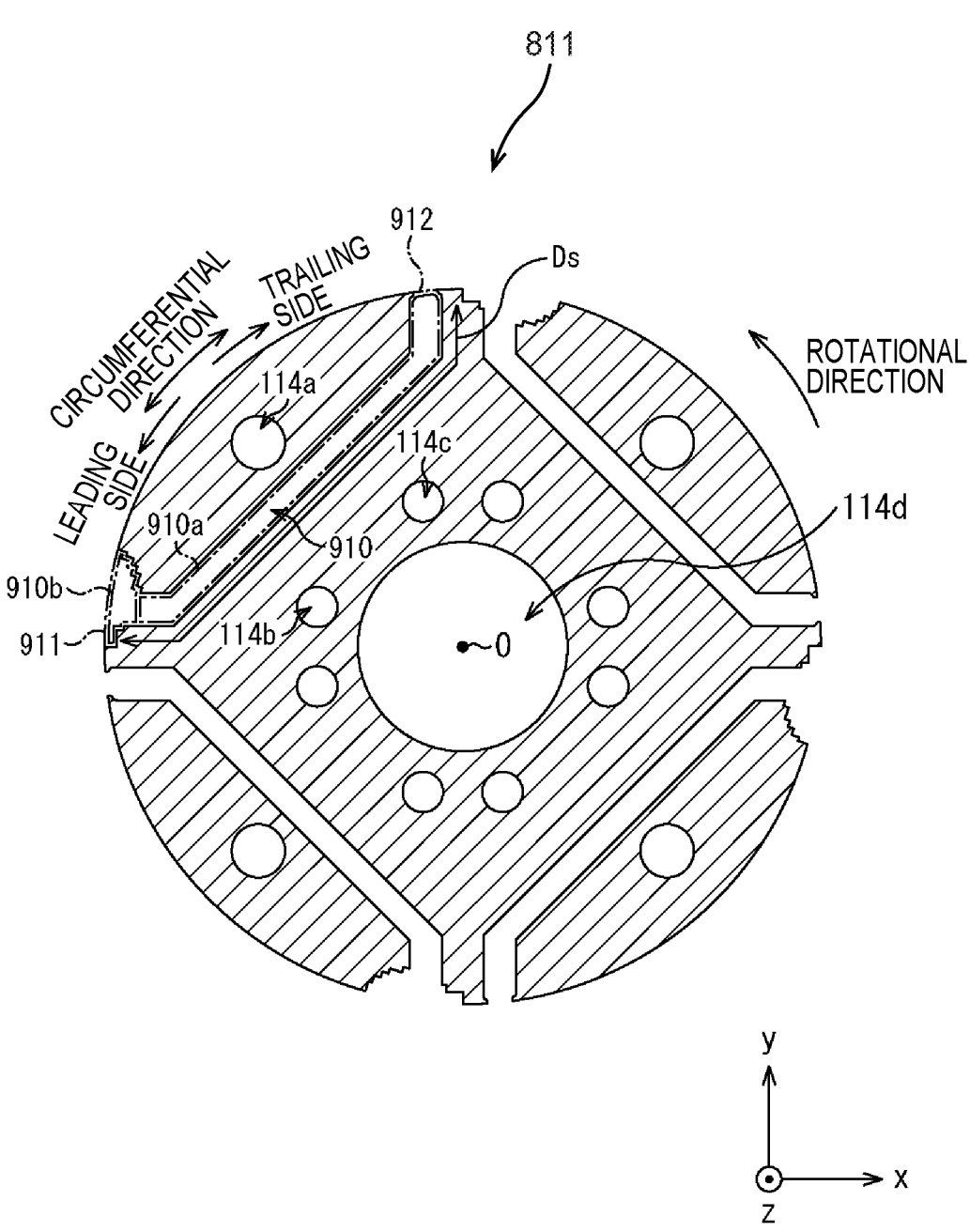
FIG. 9 is a view showing a second example of the configuration of a rotor core and is with respect to the rotor of FIG. 8.

FIG. 9 is a view showing an example of the configuration of the rotor core 811. FIG. 9 is a sectional view of the rotor core 811 as cut perpendicular to a centerline O of the rotor core 811 and corresponds to FIG. 3. It will be noted that in FIG. 9 also, as in FIG. 3, only a portion configuring one pole of the rotor core 811 is assigned reference signs, and reference signs for portions configuring the other three poles of the rotor core 811 are omitted.

In FIG. 9, in the rotor core 811, a hole 910 including a magnet-occupied region and regions serving as the flux barriers 813 is formed.

In the rotor core cross-section, a first end portion 911 of the hole 910 is open. Furthermore, a second end portion 912 of the hole 910 is also open in the rotor core cross-section.

As in the first embodiment, in the present embodiment also, a case where, in the rotor cross-section, all four holes 910 in which the permanent magnets 112 are installed are open at the first end portions 911 of the holes 910 is described as an example. However, the first end portion 911 of the hole 910 may be open in at least one of the four holes 910 in which the permanent magnets 112 are installed. Likewise, a case where the second end portion 912 of the hole 910 is open in all four holes 910 in which the permanent magnets 112 are installed is described as an example. However, the second end portion 912 of the hole 910 may be open in at least one of the four holes 910 in which the permanent magnets 112 are installed.

Figure 10:
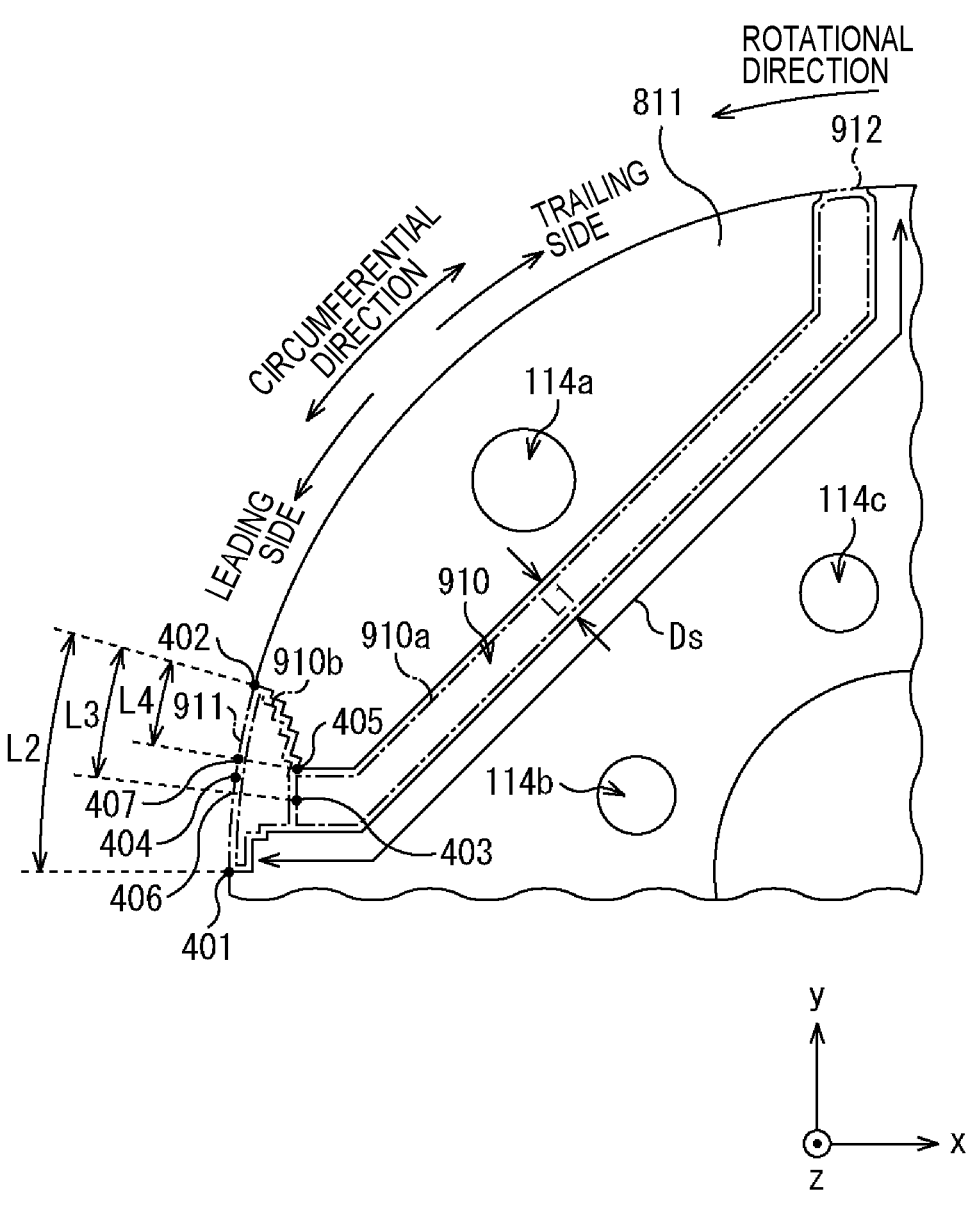
FIG. 10 is a view describing a second example of the inner space and the first outer space.

In FIG. 9, the hole 910 has an inner space 910a and a first outer space 910b. FIG. 10 is a view describing the inner space 910a and the first outer space 910b and corresponds to FIG. 4.

In FIG. 10, the first outer space 910b is the same as the first outer space 310b shown in FIG. 4.

The inner space 910a is, among the spaces configuring the hole 910 in the rotor core section, a space whose width direction length is equal to a length L1 corresponding to the length of the permanent magnet 112 in the direction of magnetization Dm and substantially constant.

As in the first embodiment, the end portion of the inner space 910a on the leading side is coincident with the end portion of the first outer space 910b on the trailing side. Furthermore, the end portion of the inner space 910a on the trailing side (i.e., the end portion on the opposite side of the side that communicates with the first outer space 910b) is coincident with the second end portion 912 of the hole 910. Consequently, the circumferential direction length of the second end portion 912 of the hole 910 is substantially the same as the width direction length L1 of the inner space 910a. By contrast, a circumferential direction length L2 of the first end portion 911 of the hole 910 is longer than the circumferential direction length L1 of the second end portion 912 of the hole 910. In this way, the circumferential direction lengths L2, L1 of the open end portions 911, 912 among the end portions of the hole 910 in the left and right direction Ds are such that that of the end portion 911 on the leading side is longer than that of the end portion 912 on the trailing side (L2>L1). Consequently, the effect of increasing the torque T of the IPMSM can be realized while obtaining the action whereby the magnetic flux 701 recirculating in the rotor core 111 shown in FIG. 7A is no longer generated. At the same time, in a case where the rotor core is formed using just the soft magnetic body, the mechanical strength of the rotor core 811 is reduced compared to that of the rotor core 111 of the first embodiment. Thus, for example, it is preferred that a nonmagnetic body be installed in part or all of the region of the flux barrier 813b so that the mechanical strength of the rotor core 811 is not reduced. Consequently, for example, in a case where importance is attached to preventing the generation of the magnetic flux 701 recirculating in the rotor core, the second embodiment may be employed, and in a case where importance is attached to preventing a reduction in the mechanical strength of the rotor core, the first embodiment may be employed. It will be noted that in the present embodiment also, the various example modifications described in the first embodiment may also be employed.

(Example Calculation)

In the present example calculation, an electromagnetic field analysis of IPMSMs when the IPMSMs were operated under the operating conditions of a 3,000 rpm rotational speed, (an effective value of) an excitation current of 5.5 A, and an advance angle of 20 deg was executed by the finite element method. Then, the Maxwell stress tensors were calculated based on the magnetic flux density vectors obtained as a result of the electromagnetic field analysis, and the torques T of the IPMSMs were calculated from the Maxwell stress tensors. Below, the rotor 110 of the first embodiment will be called the rotor of example 1 and the rotor 810 of the second embodiment will be called the rotor of example 2.

Figure 11:
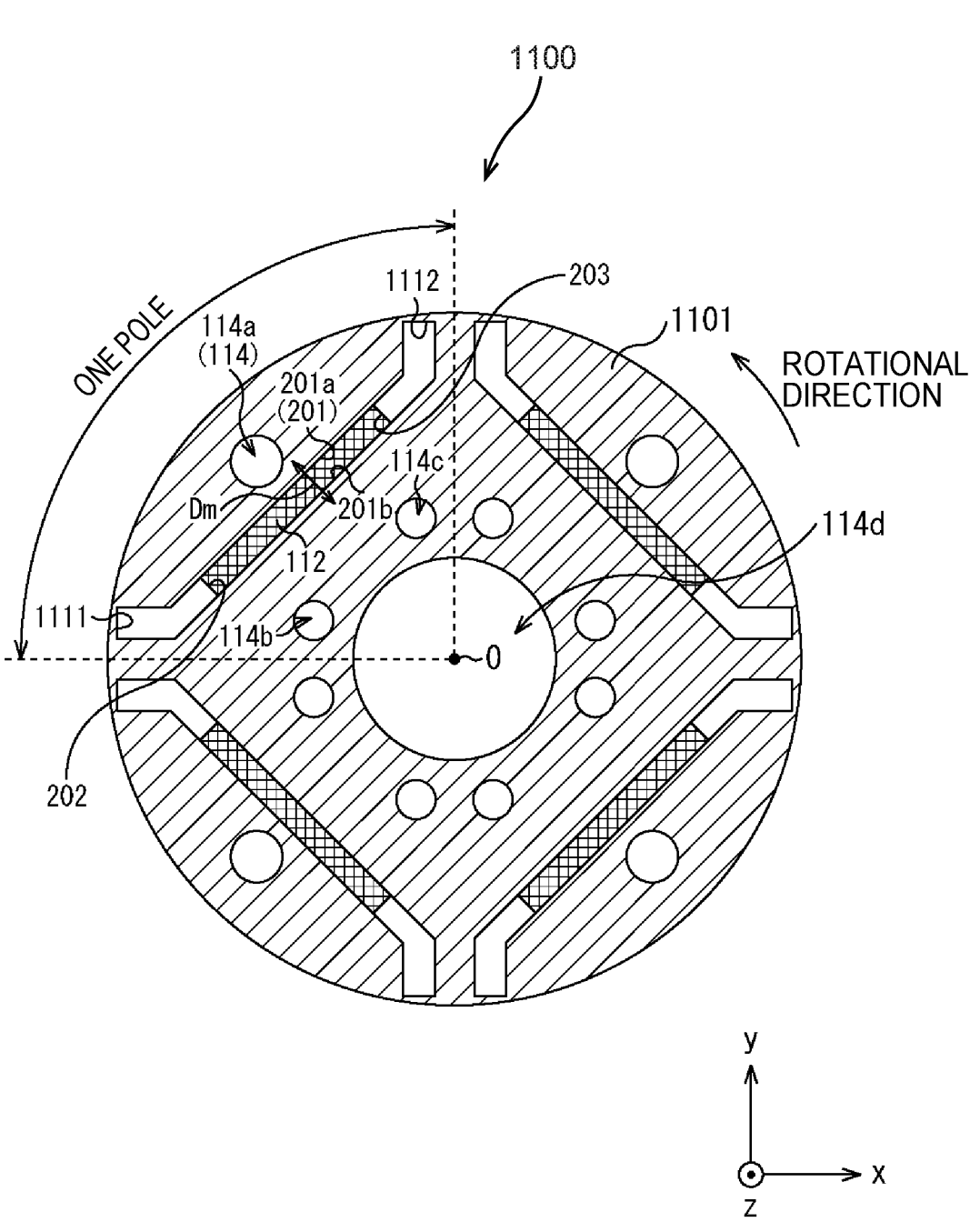
FIG. 11 is a view showing the configuration of a rotor of comparative example 1.

FIG. 11 is a view showing the configuration of a rotor 1100 of comparative example 1. FIG. 11 is a sectional view of the rotor 1100 as cut perpendicular to a centerline O of the rotor 1100 and corresponds to FIG. 2. The shape of the rotor cross-section has the shape shown in FIG. 11 in any position in the z-axis direction of the rotor 1100. Furthermore, as in examples 1 and 2, in comparative example 1 also, a case where the number of poles that the IPMSM has is four is described as an example. Furthermore, in FIG. 11 also, as in FIG. 2, only a portion configuring one pole of the rotor 1100 is assigned signs, and reference signs for portions configuring the other three poles of the rotor 1100 are omitted, because otherwise the notation would become complicated. As shown in FIG. 11, in the rotor 1100 of comparative example 1, in the rotor core cross-section, both a first end portion 1111 of the hole in which the permanent magnet 112 is installed and a second end portion 1112 of the hole in which the permanent magnet 112 is installed are not open.

Figure 12:
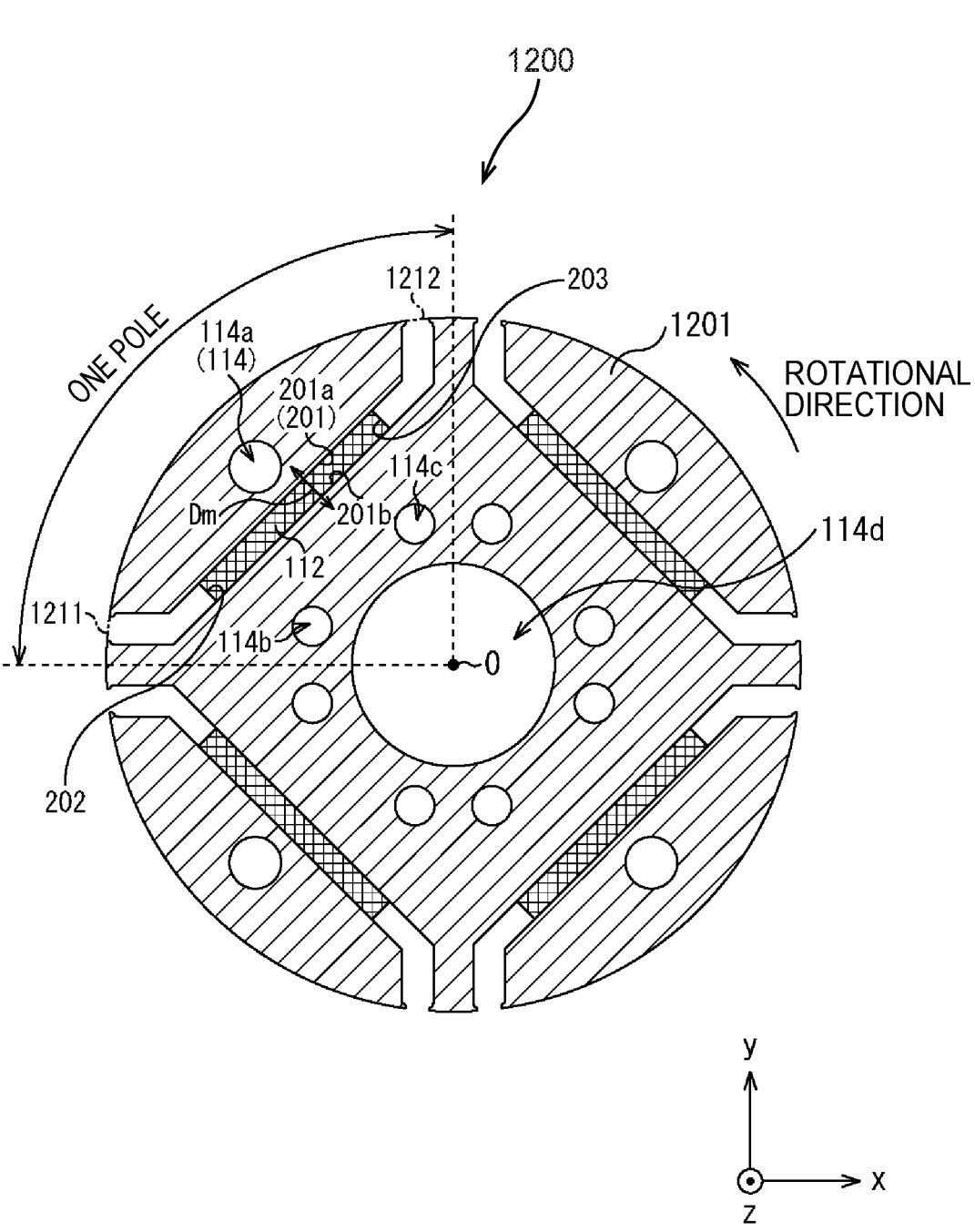
FIG. 12 is a view showing the configuration of a rotor of comparative example 2.

FIG. 12 shows the configuration of a rotor 1200 of comparative example 2. FIG. 12 is a sectional view of the rotor 1200 as cut perpendicular to a centerline O of the rotor 1200 and corresponds to FIG. 2. The shape of the rotor cross-section has the shape shown in FIG. 12 in any position in the z-axis direction of the rotor 1200. Furthermore, as in examples 1 and 2, in comparative example 2, a case where the number of poles that the IPMSM has is four is described as an example. Furthermore, in FIG. 12 also, as in FIG. 2, only a portion configuring one pole of the rotor 1200 is assigned reference signs, and reference signs for portions configuring the other three poles of the rotor 1200 are omitted, because otherwise the notation would become complicated. As shown in FIG. 12, in the rotor 1200 of comparative example 2, in the rotor core cross-section, both a first end portion 1211 of the hole in which the permanent magnet 112 is installed and a second end portion 1212 of the hole in which the permanent magnet 112 is installed are open. However, the circumferential direction length of the first end portion 1211 of the hole in which the permanent magnet 112 is installed and the circumferential direction length of the second end portion 1212 of the hole in which the permanent magnet 112 is installed are the same (substantially the same as a length L1 corresponding to the length of the permanent magnet 112 in the direction of magnetization Dm).

When the rotor 1100 of comparative example 1 shown in FIG. 11 was used, the torque T of the IPMSM was 0.800 Nm. By contrast, when the rotor 110 of example 1 shown in FIG. 2 was used, the torque T of the IPMSM was 1.199 Nm. In this way, in example 1, the torque T of the IPMSM increased 49.9% over that of comparative example 1. Consequently, it can be understood that by forming the first outer space 310b on the leading side of the hole 310 in the left and right direction Ds as shown in FIG. 3, the torque T of the IPMSM can be increased.

Furthermore, when the rotor 1200 of comparative example 2 shown in FIG. 12 was used, the torque T of the IPMSM was 0.956 Nm. By contrast, when the rotor 810 of example 2 shown in FIG. 8 was used, the torque T of the IPMSM was 1.251 Nm. In this way, in example 2, the torque T of the IPMSM increased 30.8% over that of comparative example 2. Consequently, it can be understood that by forming the first outer space 910b on the leading side of the hole 910 in the left and right direction Ds as shown in FIG. 9, the torque T of the IPMSM can be increased.

Furthermore, comparing example 1 and comparative example 1, the amount of increase in the torque resulting from forming the first outer space 310b on the leading side of the hole 310 in the left and right direction Ds is 0.399 (=1.199–0.800) Nm. Furthermore, comparing example 1 and example 2, the amount of increase in the torque resulting from communicating the second end portion 912 of the hole 910 with the outer peripheral surface of the rotor core 811 is 0.052 (1.251–1.199) Nm. Consequently, it can be understood that by forming the first outer space 310b on the leading side of the hole 310 in the left and right direction Ds, the torque T of the IPMSM can be effectively increased.

(Example Modifications)

In the first embodiment and the second embodiment, cases where the shapes of the rotor core cross-sections had the shapes shown in FIG. 2 and FIG. 8 in any position in the z-axis direction of the rotors 110, 810 were described as an example. However, it is not always necessary for this to be the case. For example, as long as the torque of the IPMSM is increased as a whole over that of a case where the rotor core cross-section is not given the shapes shown in FIG. 2 and FIG. 8 in all positions in the z-axis direction of the rotors 110, 810, the shape of the rotor cross-section need not be the shapes shown in FIG. 2 and FIG. 8 at a position in a part of the rotors 110, 810 in the z-axis direction.

For example, the shape of the rotor cross-section may also be the shape shown in FIG. 11 or FIG. 12 at a position in a part of the rotor 110 in the z-axis direction.

Furthermore, in the first embodiment and the second embodiment, a case where one pole is configured by one permanent magnet 112 was described as an example, but the present disclosure is not limited thereto. One pole may also be configured by more than one permanent magnet 112.

Furthermore, in the first embodiment and the second embodiment, a case where the IPMSM 100 is an inner rotor type was described as an example. However, the first end portion and the second end portion of the hole in which the permanent magnet 112 is installed may also be formed as described in the first embodiment and the second embodiment in a rotor of a motor of an outer rotor type of IPMSM. In this case, the inner peripheral surface of the rotor serves as the end surface that opposes the stator across a gap. Furthermore, the first end portion and the second end portion of the hole in which the permanent magnet 112 is installed may also be formed as described in the first embodiment and the second embodiment in a rotor of a permanent magnet embedded type of generator rather than a permanent magnet embedded type of motor.

Furthermore, in one rotor core cross-section, both an end portion that is not open as in the first embodiment and an end portion whose circumferential direction length is shorter than the circumferential direction length of the open end portion of the first end portion of the hole as in the second embodiment may be included as the second end portions of the holes in which the permanent magnets are installed.

Furthermore, the embodiments of the present disclosure described above are all merely illustrative of examples of instantiations when implementing the present disclosure, and the technical scope of the present disclosure should not be narrowly construed by them. That is, the present disclosure may be implemented in various ways without departing from the technical thought or the major features thereof.

In relation to the above embodiments, the following supplementary notes are further disclosed.

(Supplementary Note 1)

A rotor core including plural holes in which permanent magnets are installed, wherein:

in a cross-section of the rotor core perpendicular to a rotational axis serving as a center of rotation, at least one of the plural holes includes a first end portion positioned on a leading side in a rotational direction in a left and right direction, which is a direction on both left and right sides relative to a direction of magnetization of the permanent magnet, and a second end portion positioned on a trailing side in the rotational direction in the left and right direction;

the first end portion is open; and in the cross-section, a circumferential direction length of the opening is longer than a circumferential direction length of the second end portion.

(Supplementary Note 2)

The rotor core of supplementary note 1, wherein in the cross-section, the circumferential direction length of the opening is longer than the length, in the direction of magnetization of the permanent magnet, of the region of the hole occupied by the permanent magnet.

(Supplementary Note 3)

The rotor core of supplementary note 1 or supplementary note 2, wherein in the cross-section, the first end portions of all the holes are open.

(Supplementary Note 4)

The rotor core of any one of supplementary note 1 to supplementary note 3, wherein in the cross-section, the second end portion of at least one of the holes is not open.

(Supplementary Note 5)

The rotor core of any one of supplementary note 1 to supplementary note 4, wherein in the cross-section, the second end portions of all the holes are not open.

(Supplementary Note 6)

The rotor core of any one of supplementary note 1 to supplementary note 5, wherein in the cross-section, the hole in which the first end portion is open has an inner space whose width direction length is equal to a length corresponding to the length of the permanent magnet in the direction of magnetization and a first outer space that communicates with the inner space, has the first end portion as one end portion of the hole in the left and right direction, and is wider than the inner space, and the first end portion is disposed off-center on the trailing side in the rotational direction relative to a circumferential direction center position of the inner space at the position where the inner space communicates with the first outer space.

(Supplementary Note 7)

The rotor core of supplementary note 6, wherein in the cross-section, a circumferential direction length in a direction heading toward the trailing side in the rotational direction from a trailing side endpoint extrapolated position of the inner space to an endpoint on the trailing side in the rotational direction among endpoints of the first end portion is equal to or greater than the width direction length of the inner space, and the trailing side endpoint extrapolated position of the inner space is the position of an intersection between the first end portion and a straight line extending along a radial direction of the rotor core from an endpoint of the inner space on the trailing side at the position where the inner space communicates with the first outer space in the cross-section.

(Supplementary Note 8)

A rotor including:

the rotor core of any one of supplementary note 1 to supplementary note 7; and the permanent magnets.

(Supplementary Note 9)

A rotating electrical machine including:

the rotor of supplementary note 8; and a stator.

(Supplementary Note 10)

A rotor core including plural holes in which permanent magnets are installed, wherein:

in a cross-section of the rotor core perpendicular to a rotational axis serving as a center of rotation, at least one of the plural holes includes a first end portion positioned on a leading side in a rotational direction in a left and right direction, which is a direction on both left and right sides relative to a direction of magnetization of the permanent magnet, and a second end portion positioned on a trailing side in the rotational direction in the left and right direction;

the first end portion is open to an outer peripheral surface of the rotor core, and a circumferential direction length of the opening is longer than a circumferential direction length of the second end portion;

in the cross-section, the hole in which the first end portion is open has an inner space whose width direction length is equal to a length corresponding to a length of the permanent magnet in the direction of magnetization and a first outer space that communicates with the inner space, has the first end portion as one end portion of the hole in the left and right direction, and is wider than the inner space; and the first end portion is disposed off-center on the trailing side in the rotational direction relative to a circumferential direction center position of the inner space at a position where the inner space communicates with the first outer space.

(Supplementary Note 11)

The rotor core of supplementary note 10, wherein in the cross-section, a circumferential direction length in a direction heading toward the trailing side in the rotational direction from a trailing side endpoint extrapolated position of the inner space to an endpoint on the trailing side in the rotational direction among endpoints of the first end portion is equal to or greater than the width direction length of the inner space, and the trailing side endpoint extrapolated position of the inner space is a position of an intersection between the first end portion and a straight line extending along a radial direction of the rotor core from an endpoint of the inner space on the trailing side at the position where the inner space communicates with the first outer space in the cross-section.

(Supplementary Note 12)

The rotor core of supplementary note 10 or supplementary note 11, wherein in a hole wall surface configuring the hole, a trailing side wall surface configuring a trailing side of the first outer space in the rotational direction is inclined relative to a direction orthogonal to the rotational axis.

(Supplementary Note 13)

The rotor core of supplementary note 11 or supplementary note 12, wherein at least part of the trailing side wall surface is concavely curved.

(Supplementary Note 14)

The rotor core of any one of supplementary note 10 to supplementary note 13, wherein in the cross-section, the circumferential direction length of the opening is longer than a length, in the direction of magnetization of a permanent magnet, of the region of the hole occupied by the permanent magnet.

(Supplementary Note 15)

The rotor core of any one of supplementary note 10 to supplementary note 14, wherein in the cross-section, first end portions of all the holes are open.

(Supplementary Note 16)

The rotor core of any one of supplementary note 10 to supplementary note 15, wherein in the cross-section, a second end portion of at least one of the holes is not open.

(Supplementary Note 17)

The rotor core of any one of supplementary note 10 to supplementary note 16, wherein in the cross-section, second end portions of all the holes are not open.

(Supplementary Note 18)

A rotor including:

the rotor core of any one of any one of supplementary note 10 to supplementary note 17; and the permanent magnets.

(Supplementary Note 19)

A rotating electrical machine including:

the rotor of supplementary note 18; and a stator.

Furthermore, the disclosure of Japanese Patent Application 2021-060596 filed on Mar. 31, 2021, is incorporated in its entirety herein by reference.

All documents, patent applications, and technical standards mentioned in this specification are incorporated herein by reference to the same extent as if each individual document, patent application, or technical standard were specifically and individually indicated to be incorporated by reference.

The invention claimed is:

1. A rotor core comprising plural holes in which permanent magnets are installed, wherein:

in a cross-section of the rotor core perpendicular to a rotational axis serving as a center of rotation, at least one of the plural holes includes a first end portion positioned on a leading side in a rotational direction in a left and right direction, which is a direction on both left and right sides relative to a direction of magnetization of the permanent magnet, and a second end portion positioned on a trailing side in the rotational direction in the left and right direction;

the first end portion is open to an outer peripheral surface of the rotor core, and a circumferential direction length of the opening is longer than a maximum circumferential direction length of the second end portion;

in the cross-section, the hole in which the first end portion is open has an inner space whose width direction length is equal to a length corresponding to a length of the permanent magnet in the direction of magnetization and a first outer space that communicates with the inner space, has the first end portion as one end portion of the hole in the left and right direction, and is wider than a minimum circumferential direction length of the inner space;

the first end portion is disposed off-center on the trailing side in the rotational direction relative to a circumferential direction center position of the inner space at a position where the inner space communicates with the first outer space, in the cross-section, a circumferential direction length in a direction heading toward the trailing side in the rotational direction from a trailing side endpoint extrapolated position of the inner space to an endpoint on the trailing side in the rotational direction among endpoints of the first end portion is equal to or greater than the width direction length of the inner space, and the trailing side endpoint extrapolated position of the inner space is a position of an intersection between the first end portion and a straight line extending along a radial direction of the rotor core from an endpoint of the inner space on the trailing side at the position where the inner space communicates with the first outer space in the cross-section.

2. The rotor core of claim 1, wherein, in a hole wall surface configuring the hole, a trailing side wall surface configuring a trailing side of the first outer space in the rotational direction is inclined relative to a direction orthogonal to the rotational axis.

3. The rotor core of claim 2, wherein at least part of the trailing side wall surface is concavely curved.

4. The rotor core of claim 1, wherein, in the cross-section, the circumferential direction length of the opening is longer than a length, in the direction of magnetization of the permanent magnet, of a region of the hole occupied by the permanent magnet.

5. The rotor core of claim 1, wherein, in the cross-section, first end portions of all the holes are open.

6. The rotor core of claim 1, wherein, in the cross-section, a second end portion of at least one of the holes is not open.

7. The rotor core of claim 1, wherein, in the cross-section, second end portions of all the holes are not open.

8. A rotor comprising:

the rotor core of claim 1; and the permanent magnets.

9. A rotating electrical machine comprising:

the rotor of claim 8; and a stator.

* * * * *